United States Patent
Amundson et al.

(10) Patent No.: US 7,181,317 B2
(45) Date of Patent: Feb. 20, 2007

(54) CONTROLLER INTERFACE WITH INTERVIEW PROGRAMMING

(75) Inventors: John B. Amundson, Plymouth, MN (US); Heidi J. Finch, Champlin, MN (US); Brent D. Vick, Minnetonka, MN (US)

(73) Assignee: Honeywell International Inc., Morristown, NJ (US)

( * ) Notice: Subject to any disclaimer, the term of this patent is extended or adjusted under 35 U.S.C. 154(b) by 303 days.

(21) Appl. No.: 10/726,245

(22) Filed: Dec. 2, 2003

(65) Prior Publication Data

US 2005/0119771 A1    Jun. 2, 2005

(51) Int. Cl.
*G05D 3/12* (2006.01)
*G05B 19/42* (2006.01)

(52) U.S. Cl. .......................... 700/276; 700/86
(58) Field of Classification Search ................ 700/276, 700/86, 83, 17, 19, 296; 165/238, 239, 289; 236/91 F, 99 E
See application file for complete search history.

(56) References Cited

U.S. PATENT DOCUMENTS

| | | | |
|---|---|---|---|
| 4,079,366 A | 3/1978 | Wong | |
| 4,174,807 A | 11/1979 | Smith et al. | |
| 4,206,872 A | 6/1980 | Levine | |
| 4,224,615 A | 9/1980 | Penz | |
| 4,264,034 A | 4/1981 | Hyltin et al. | |
| 4,298,946 A | 11/1981 | Hartsell et al. | |
| 4,308,991 A | 1/1982 | Peinetti et al. | |
| 4,337,822 A | 7/1982 | Hyltin et al. | |
| 4,382,544 A | 5/1983 | Stewart | |
| 4,386,649 A | 6/1983 | Hines et al. | |
| 4,388,692 A | 6/1983 | Jones et al. | |
| 4,431,134 A | 2/1984 | Hendricks et al. | |
| 4,442,972 A | 4/1984 | Sahay et al. | |
| 4,446,913 A | 5/1984 | Krocker | |
| 4,479,604 A | 10/1984 | Didner | |
| 4,506,827 A | 3/1985 | Jamieson et al. | |
| 4,606,401 A | 8/1986 | Levine et al. | |
| 4,621,336 A | 11/1986 | Brown | |
| 4,622,544 A | 11/1986 | Bially et al. | |
| 4,717,333 A | 1/1988 | Carignan | |
| 4,725,001 A | 2/1988 | Carney et al. | |
| 4,819,714 A * | 4/1989 | Otsuka et al. | ............. 165/217 |

(Continued)

FOREIGN PATENT DOCUMENTS

DE    3334117.6    4/1985

(Continued)

OTHER PUBLICATIONS

ADT Security Systems, "iCenter Advanced User Interface 8142ADT User Guide," pp. 1-136, 2001.

(Continued)

*Primary Examiner*—Thomas Pham

(57) ABSTRACT

A controller and a method of programming a schedule of a controller having a user interface, the schedule having a number of schedule parameters, the method including the steps of: providing one or more interview questions to a user via the user interface; accepting one or more user responses to the one or more interview questions from the user via the user interface; and modifying one or more of the schedule parameters based on the user responses provided by the user interface.

40 Claims, 20 Drawing Sheets

U.S. PATENT DOCUMENTS

| | | | |
|---|---|---|---|
| 4,837,731 | A | 6/1989 | Levine et al. |
| 4,881,686 | A | 11/1989 | Mehta |
| 4,918,439 | A | 4/1990 | Wozniak et al. |
| 4,948,040 | A * | 8/1990 | Kobayashi et al. ........ 236/49.3 |
| 4,992,779 | A | 2/1991 | Sugino et al. |
| 4,997,029 | A | 3/1991 | Otsuka et al. |
| 5,012,973 | A | 5/1991 | Dick et al. |
| 5,038,851 | A | 8/1991 | Metha |
| 5,053,752 | A | 10/1991 | Epstein et al. |
| 5,065,813 | A | 11/1991 | Berkeley et al. |
| 5,086,385 | A | 2/1992 | Launey et al. |
| 5,088,645 | A | 2/1992 | Bell |
| 5,140,310 | A | 8/1992 | DeLuca et al. |
| 5,161,606 | A | 11/1992 | Berkeley et al. |
| 5,170,935 | A | 12/1992 | Federspiel et al. |
| 5,181,653 | A | 1/1993 | Foster et al. |
| 5,230,482 | A | 7/1993 | Ratz et al. |
| 5,238,184 | A | 8/1993 | Adams |
| 5,251,813 | A | 10/1993 | Kniepkamp |
| 5,259,445 | A | 11/1993 | Pratt et al. |
| 5,329,991 | A | 7/1994 | Metha et al. |
| 5,348,078 | A | 9/1994 | Dushane et al. |
| 5,386,577 | A | 1/1995 | Zenda |
| 5,482,209 | A | 1/1996 | Cochran et al. |
| 5,526,422 | A | 6/1996 | Keen |
| 5,537,106 | A | 7/1996 | Mitcuhashi |
| 5,566,879 | A | 10/1996 | Longtin |
| 5,570,837 | A | 11/1996 | Brown et al. |
| 5,673,850 | A | 10/1997 | Uptegraph |
| 5,761,083 | A * | 6/1998 | Brown et al. ............... 700/296 |
| 5,782,296 | A | 7/1998 | Metha |
| 5,818,428 | A | 10/1998 | Eisenbrandt et al. |
| 5,873,519 | A | 2/1999 | Beilfuss |
| 5,877,957 | A * | 3/1999 | Bennett ....................... 700/86 |
| 5,886,697 | A | 3/1999 | Naughton et al. |
| 5,902,183 | A | 5/1999 | D'Souza |
| 5,937,942 | A | 8/1999 | Bias et al. |
| 5,947,372 | A | 9/1999 | Tiernan |
| 6,020,881 | A | 2/2000 | Naughton et al. |
| 6,032,867 | A | 3/2000 | Dushane et al. |
| 6,059,195 | A | 5/2000 | Adams et al. |
| 6,081,197 | A | 6/2000 | Garrick et al. |
| 6,121,875 | A | 9/2000 | Hamm et al. |
| 6,140,987 | A | 10/2000 | Stein et al. |
| 6,192,282 | B1 | 2/2001 | Smith et al. |
| 6,196,467 | B1 | 3/2001 | Dushane et al. |
| 6,208,331 | B1 | 3/2001 | Singh et al. |
| 6,236,326 | B1 | 5/2001 | Murphy |
| 6,285,912 | B1 | 9/2001 | Ellison et al. |
| 6,290,140 | B1 | 9/2001 | Pesko et al. |
| 6,315,211 | B1 | 11/2001 | Sartain et al. |
| 6,318,639 | B1 | 11/2001 | Toth |
| 6,330,806 | B1 | 12/2001 | Beaverson et al. |
| 6,351,693 | B1 | 2/2002 | Monie et al. |
| 6,344,861 | B1 | 3/2002 | Naughton et al. |
| 6,398,118 | B1 | 6/2002 | Rosen et al. |
| 6,478,233 | B1 | 11/2002 | Shah |
| 6,502,758 | B2 | 1/2003 | Cottrell |
| 6,518,957 | B1 | 2/2003 | Lehtinen et al. |
| 6,578,770 | B1 | 6/2003 | Rosen |
| 6,580,950 | B1 | 6/2003 | Johnson et al. |
| 6,581,846 | B1 | 6/2003 | Rosen |
| 6,595,430 | B1 | 7/2003 | Shah |
| 6,619,555 | B2 | 9/2003 | Rosen |
| 6,621,507 | B1 | 9/2003 | Shah |
| 6,786,421 | B2 | 9/2004 | Rosen |
| 6,824,069 | B2 * | 11/2004 | Rosen .......................... 236/94 |
| 6,967,565 | B2 * | 11/2005 | Lingemann ............ 340/286.02 |
| 2001/0029585 | A1 | 10/2001 | Simon et al. |
| 2001/0042684 | A1 | 11/2001 | Essalik et al. |
| 2001/0052459 | A1 | 12/2001 | Essalik et al. |
| 2002/0005435 | A1 | 1/2002 | Cottrell |
| 2002/0022991 | A1 | 2/2002 | Sharood et al. |
| 2002/0060701 | A1 | 5/2002 | Naughton et al. |
| 2002/0092779 | A1 | 7/2002 | Essalik et al. |
| 2003/0034897 | A1 | 2/2003 | Shamoon et al. |
| 2003/0034898 | A1 | 2/2003 | Shamoon et al. |
| 2003/0121652 | A1 | 7/2003 | Carey et al. |
| 2003/0123224 | A1 | 7/2003 | LaCroix et al. |
| 2003/0142121 | A1 | 7/2003 | Rosen |
| 2003/0150926 | A1 | 8/2003 | Rosen |
| 2003/0150927 | A1 | 8/2003 | Rosen |
| 2004/0074978 | A1 | 4/2004 | Rosen |
| 2004/0193324 | A1 * | 9/2004 | Hoog et al. ................. 700/276 |
| 2004/0245352 | A1 | 12/2004 | Smith |

FOREIGN PATENT DOCUMENTS

| | | |
|---|---|---|
| EP | 0678204 | 3/2000 |
| EP | 0985994 | 3/2000 |
| EP | 1074009 | 7/2001 |
| WO | WO 97/11448 | 3/1997 |
| WO | WO 97/39392 | 10/1997 |
| WO | WO 00/43870 A | 7/2000 |
| WO | WO 01/52515 | 7/2001 |
| WO | WO 01/79952 | 10/2001 |
| WO | WO 01/93779 | 12/2001 |

OTHER PUBLICATIONS

DeKoven et al., "Measuring Task Models in Designing Intelligent Products," pp. 188-189, 2002.

http://www.hometoys.com/htinews/apr99/releases/ha101.htm, HTI News Release, pp. 1-3, printed Oct. 28, 2004.

U.S. Appl. No. 10/440,474, filed May 15, 2003, entitled "Reverse Images in a Dot Matrix LCD for an Environmental Control Device."

U.S. Appl. No. 10/654,230, filed Sep. 3, 2003, entitled "Programmable Thermostat Incorporating a Liquid Crystal Display and Having a Feature for Mounting Horizontally, Vertically and any Intermediate Orientation."

U.S. Appl. No. 10/654,235, filed Sep. 3, 2003, entitled "Programmable Thermostat Incorporating a Liquid Crystal Display Selectively Presenting Adaptable System Menus Including Changeable Interactive Virtual Buttons."

Carrier, "Programmable Dual Fuel Thermostat," Installation, Start-Up & Operating Instructions, pp. 1-12, Oct. 1998.

Carrier, "Programmable Thermostats," Installation, Start-Up & Operating Instructions, pp. 1-16, Sep. 1998.

Carrier, "Standard Programmable Thermostat," Homeowner's Manual, pp. 1-8 pages, 1998.

Carrier, "Thermidistat Control," Installation, Start-Up, and Operating Instructions, pp. 1-12, Aug. 1999.

CorAccess, "Companion 6," User Guide, pp. 1-20, Jun. 17, 2002.

http://www.thermostatsales.com, Robertshaw, "9610 Digital Programmable Thermostat," 3 pages, printed Jun. 17, 2004.

http://www.thermostatsales.com, Robertshaw, "9700 Deluxe Programmable Thermostat" 3 pages, printed Jun. 17, 2004.

http://www.thermostatsales.com, Robertshaw, "9710 Deluxe Programmable Thermostat," 3 pages, printed Jun. 17, 2004.

http://www.thermostatsales.com, Robertshaw, "9720 Deluxe Programmable Thermostat," 3 pages, printed Jun. 17, 2004.

METASYS, "HVAC Pro for Windows User's Manual," 308 pages, 1998.

http://www.ritetemp.info/rtMenu_13.html, Rite Temp 8082, 8 pages, printed Jun. 20, 2003.

Totaline, "1 For All programmable Digital Thermostat," Owner's Manual P/N P374-1100FM, 23 pages, Nov. 1998.

Totaline, "1 For All Programmable Digital Thermostat," Owner's Manual P/N P474-1050, 21 pages, Nov. 1998.

Totaline, "For All Programmable Digital Thermostat," Owner's Manual P/N P374-1100, 24 pages, Apr. 2001.

Totaline, "Intellistat Combination Temperature and Humidity Control," Owner's Manual P/N P374-1600, 25 pages, Jun. 2001.

Totaline, "Programmable Thermostat Configurable for Advanced Heat Pump or Dual Fuel Operation," Owner's Manual P/N P374-1500, 24 pages, Jun. 1999.
Totaline, "Instructions P/N P474-1010", Manual, 2 pages, Dec. 1998.
Totaline, "Programmable Thermostat", Homeowner's Guide, 27 pages, Dec. 1998.
Totaline, "Wireless Programmable Digital Thermostat," Owner's Manual 474-1100RF, 21 pages, 2000.
Blister Pack Insert from a Ritetemp 8082 Touch Screen Thermostat Product, 2 pages, 2002.
Operation Manual for Ritetemp Touch Screen Thermostat 8082, 8 pages, 2002.
Trouble Shooting Guide for Ritetemp Thermostat 8082, 1 page, 2002.
Quick Start Guide for Ritetemp Thermostat 8082, 1 page, 2002.
Install Guide for Ritetemp Thermostat 8082, 6 pages, 2002.
Remote Control Power Requirement for Ritetemp Thermostat 8082, 1 page, 2002.
Mounting Template for Ritetemp Thermostat 8082, 1 page, 2002.
ADI, "Leopard User Manual," 93 pages, 2001.
Adicon 2500, "The Automator," 4 pages, Oct.-Dec. 2000.
ADT Security Services, "iCenter Advanced User Interface 8142ADT," Installation and Setup Guide, 5 pages, May 2001; First Sale Feb. 2001.
Business Wire, "MicroTouch Specialty Products Group to Capitalize on Growing Market for Low-Cost Digital Matrix Touchscreens," p1174 (2 pages), Jan. 6. 1999.
Climatouch, User Manual, Climatouch CT03TSB Thermostat, Climatouch CT03TSHB Thermostat with Humidity Control, Outdoor UHF Temperature Transmitter 217S31, 19 pages, Printed Sep. 15, 2004.
DeKoven et al., "Designing Collaboration in Consumer Products," 2 pages, 2001.
Freudenthal et al., "Communicating extensive smart home functionality to users of all ages: the design of a mixed-initiative multimodal thermostat-interface," pp. 34-39, Mar. 12-13, 2001.
Honeywell News Release, "Honeywell's New Sysnet Facilities Integration System For Boiler Plant and Combustion Safety Processes," 4 pages, Dec. 15, 1995.
Honeywell, "Introduction of the S7350A Honeywell WebPAD Information Appliance," Home and Building Control Bulletin, 2 pages, Aug. 29, 2000; Picture of WebPad Device with touch screen, 1 Page; and screen shots of WebPad Device, 4 pages.
Honeywell, "W7006A Home Controller Gateway User Guide," 31 pages, Jul. 2001.
"Mark of Excellence Award Finalist Announced," http://64.233.167.104/search?Q=cache:ciOA2YtYaBIJ:www.hometoys.com/releases/mar. . ., 6 pages, Leopard Touchscreen on page 2, dated prior to Mar. 4, 2000, printed Aug. 20, 2004.
"High-tech options take hold in new homes - 200-08-28 - Dallas Business Journal," http://bizjournals.com/dallas/stories/2000/08/28/focus4, 3 pages, dated Aug. 28, 2000, printed Aug. 19, 2004.
"Product Review - Philips Pronto Remote Control," http://hometheaterhifi.com/volume 6 2/philipsprontoremotecontrol.html, 5 pages, dated May 1999, printed Aug. 20, 2004.
"CorAccess Systems/In Home," http://web.archive.org/web20011212084427/www.coraccess.com/home.html, 1 page, copyright 2001, printed Aug. 19, 2004.
"A Full Range of Alternative User Interfaces For Building Occupants and Operators," http://www.automatedbuildings.com/news/jan00/articles/andover/andover.htm, 5 pages, dated Jan. 2000, printed Sep. 20, 2004.
http://www.cc.gatech.edu/computing/classes/cs6751_94_ fall/groupc/climate-2/node1.html,"Contents," 53 pages, printed Sep. 20, 2004.
"HAI Company Background," http://www.homeauto.com/AboutHAI/aboutai_main.htm, 2 pages, printed Aug. 19, 2004.
Cardio, by Secant; http://www.hometoys.com/htinews/apr98/reviews/cardio.htm, "HTINews Review," Feb. 1998, 5 pages printed Sep. 14, 2004.

Cardio Manual, available at http://www.secant.ca/En/Documentation/Cardio2é-Manual.pdf, Cardio Home Automation Inc., 55 pages, printed Sep. 28, 2004.
Domotique Secant Home Automation - Web Page, available at http://www.secant.ca/En/Company/Default.asp, 1 page, printed Sep. 28, 2004.
"Vantage Expands Controls For Audio/Video, HVAC and Security," http://www.hometoys.com/htinews/aug99/releases/vantage03.htm, 2 pages, dated Aug. 3, 1999, printed Aug. 20, 2004.
Visor Handheld User Guide, Copyright 1999-2000.
"Home Toys Review - TouchLinc", http://www.hometoys.com/htinews/aug99/reviews/touchlinc/touchlinc.htm, 3 pages, dated Aug. 1999, printed Aug. 20,2004.
"RC X10 Automation Forum: Control your Heating and Cooling System with Pronto (1/1)," http://www.remotecentral.com/cgi-bin/mboard/rc-x 0/thread.cgi? 2, 2 pages, dated Apr. 23, 1999, printed Aug. 20, 2004.
Blake et al., "Seng 310 Final Project" Report, date Apr. 6, 2001.
Blake et al., "Seng 310 Final Project Demo Program" Illustration, 3 pages, Apr. 6, 2001.
"Spotlight on integrated systems," Custom Builder, V8, N2, p. 66(6), Mar.-Apr., 1993.
AutomatedBuildings.com Article - "Thin Client" Solutions, "Pressure, Air Flow, Temperature, Humidity & Valves," Dwyer Instruments, Inc., 5 pages, printed Sep. 20, 2004.
Aprilaire Electronic Thermostats Models 8344, 8346, 8348, 8363, 8365, 8366 Operating Instructions, 8 pages, prior to Dec. 2, 2003.
Aube Technologies, Electronic Themostat for Heating Systems Model TH135-01, 5 pages, Aug. 14, 2001.
Aube Technologies, TH140-28 Electronic Programmable Thermostat, Installation Instructions and User Guide, pp. 1-4, Jan. 22, 2004.
Braeburn Model 3000 Owner's Manual, pp. 1-13, 2001.
Braeburn Model 5000 Owners Manual, pp. 1-17, 2001.
BRK First Alert, User's Manual, Smoke and Fire Alarms, pp. 1-7, Nov. 2002.
BRK Electronics Maximum Protection Plus Ultimate Convenience Smoke Alarm, 24 pages prior to Dec. 2, 2003.
Carrier Microelectronic Programmable Thermostat Owner's Manual, pp. 1-24, May 1994.
Carrier TSTATCCRF01 Programmable Digital Thermostat, pp. 1-21, prior to Dec. 2, 2003.
Danfoss RT51/51RF & RT52/52RF User Instructions, 2 pages, Jun. 2004.
Firex Smoke Alarm, Ionization Models AD, ADC Photoelectric Model Pad, 4 pages, prior to Dec. 2, 2003.
Gentex Corporation, HD135° Fixed Temperature Heat Detector AC Pwered, 120V, 60Hz With Battery Backup, Installation Instructions–Owner's Information, pp. 1-5, Jun. 1, 1998.
Gentex Corporation, 9000 Series, Photoelectric Type Single Station/Multi-Station Smoke Alarms AC Powered With Battery Backup, Installations Instructions–Owner's Information, pp. 9-1 to 9-6, Jan. 1, 1993.
Honeywell Brivis Deluxe Programmable Thermostat, pp. 1-20, 2002.
Honeywell Brivis T8602C Chronotherm IV Deluxe Programmable Thermostats, Installations Instructions, pp. 1-12, 2002.
Honeywell CT8602C Professional Fuel Saver Thermostat, pp. 1-6, 1995.
Honeywell Electronic Programmable Thermostat, Owner's Guide, pp. 1-20, 2003.
Honeywell Electronic Programmable Thermostats, Installation Instructions, pp. 1-8, 2003.
Honeywell T8002 Programmable Thermostat, Installation Instructions, pp. 1-8, 2002.
Honeywell T8602A,B,C,D and TS8602A,C Chronotherm III Fuel Saver Thermostats, Installation Instructions, pp. 1-12, 1995.
Honeywell T8602D Chronotherm IV Deluxe Programmable Thermostats, Installations Instructions, pp. 1-12, 2002.
Honeywell TH8000 Series Programmable Thermostats, Owner's Guide, pp. 1-44, 2004.
Honeywell, MagicStat® CT3200 Programmable Thermostat, Installation and Programming Instructions, pp. 1-24, 2001.

Invensys Delux Programmable Thermostats 9700, 9701, 9715, 9720, User's Manual, 21 pages, prior to Dec. 2, 2003.
Lux TX9000 Installation, 3 pages, prior to Dec. 2, 2003.
Ritetemp Operation 8029, 3 pages, Jun. 19, 2002.
Ritetemp Operation 8050, 5 pages, Jun. 26, 2002
Ritetemp Operation 8085, pp. 1-6, prior to Dec. 2, 2003.
Sealed Unit Parts Co., Inc., Supco & CTC Thermostats . . . loaded with features, designed for value!, 6 pages, prior to Dec. 2, 2003.
Totaline Model P474-1035 Owner's Manual Programmable 5-2 Day Digital Thermostat, pp. 1-21, prior to Dec. 2, 2003.
Totalline Star CPE230RF, Commercial Programmable Thermostat Wireless Transmitter, Owner's Manual, pp. 1-16, Oct. 1998.
Totalline Star P/N P474-0130 Non-Programmable Digital Thermostat Owner's Manual, pp. 1-22, prior to Dec. 2, 2003.
White-Rodgers 1F80-224 Progammable Electronic Digital Thermostat, Installation and Operation Instructions, 8 pages, prior to Dec. 2, 2003.
White-Rodgers Installation Instructions for Heating & Air Conditioning IF78 Non-Programmable Thermostat, 6 pages, prior to Dec. 2, 2003.
White-Rodgers, Comfort-Set 90 Series Premium, 4 pages, prior to Dec. 2, 2003.

* cited by examiner

CONTROLLER INTERFACE WITH INTERVIEW PROGRAMMING

FIELD OF THE INVENTION

The present invention relates generally to the field of programmable controllers for homes and/or buildings are their related grounds. More specifically, the present invention relates to simplified interfaces for such controllers having interview programming capabilities.

BACKGROUND OF THE INVENTION

Controllers are used on a wide variety of devices and systems for controlling various functions in homes and/or buildings and their related grounds. Some controllers have schedule programming that modifies device parameter set points as a function of date and/or time. Some such device or system controllers that utilize schedule programming for controlling various functions in homes and/or buildings and their related grounds include, for example, HVAC controllers, water heater controllers, water softener controllers, security system controllers, lawn sprinkler controllers, and lighting system controllers.

HVAC controllers, for example, are employed to monitor and, if necessary, control various environmental conditions within a home, office, or other enclosed space. Such devices are useful, for example, in regulating any number of environmental conditions with a particular space including for example, temperature, humidity, venting, air quality, etc. The controller may include a microprocessor that interacts with other components in the system. For example, in many modem thermostats for use in the home, a controller unit equipped with temperature and humidity sensing capabilities may be provided to interact with a heater, blower, flue vent, air compressor, humidifier and/or other components, to control the temperature and humidity levels at various locations within the home. A sensor located within the controller unit and/or one or more remote sensors may be employed to sense when the temperature or humidity reaches a certain threshold level, causing the controller unit to send a signal to activate or deactivate one or more component in the system.

The controller may be equipped with an interface that allows the user to monitor and adjust the environmental conditions at one or more locations within the building. With more modem designs, the interface typically includes a liquid crystal display (LCD) panel inset within a housing that contains the microprocessor as well as other components of the controller. In some designs, the interface may permit the user to program the controller to activate on a certain schedule determined by the user. For example, the interface may include a separate menu routine that permits the user to change the temperature at one or more times during a particular day. Once the settings for that day have been programmed, the user can then repeat the process to change the settings for the other remaining days.

With more modem designs, the programmable controller may include a feature that allows the user to set a separate schedule for weekday and weekend use, or to copy the settings for a particular day and then apply them towards other selected days of the week. While these designs allow the user to copy settings from one day to another, a number of steps are often required to establish a program, adding to the complexity of the interface. In some cases, the interface may not permit the user to select multiple days outside of the normal weekday/weekend scheme. In other cases, the interface is simply too complex to be conveniently used to program a temperature scheme and is simply by-passed or not programmed by the user. Accordingly, there is an ongoing need in the art to decrease the time and complexity associated with programming a multi-day schedule in a programmable controller.

SUMMARY OF THE INVENTION

Generally, the present invention pertains to simplified interfaces for controllers having interview programming capabilities.

In one illustrative embodiment, a method of programming a schedule of a controller having a user interface is described. The illustrative method includes the steps of providing one or more interview questions to a user via the user interface; accepting one or more user responses to the one or more interview questions from the user via the user interface; and creating and/or modifying or building a schedule based on the user responses.

The above summary of the present invention is not intended to describe each disclosed embodiment or every implementation of the present invention. The Figures, Detailed Description and Examples which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
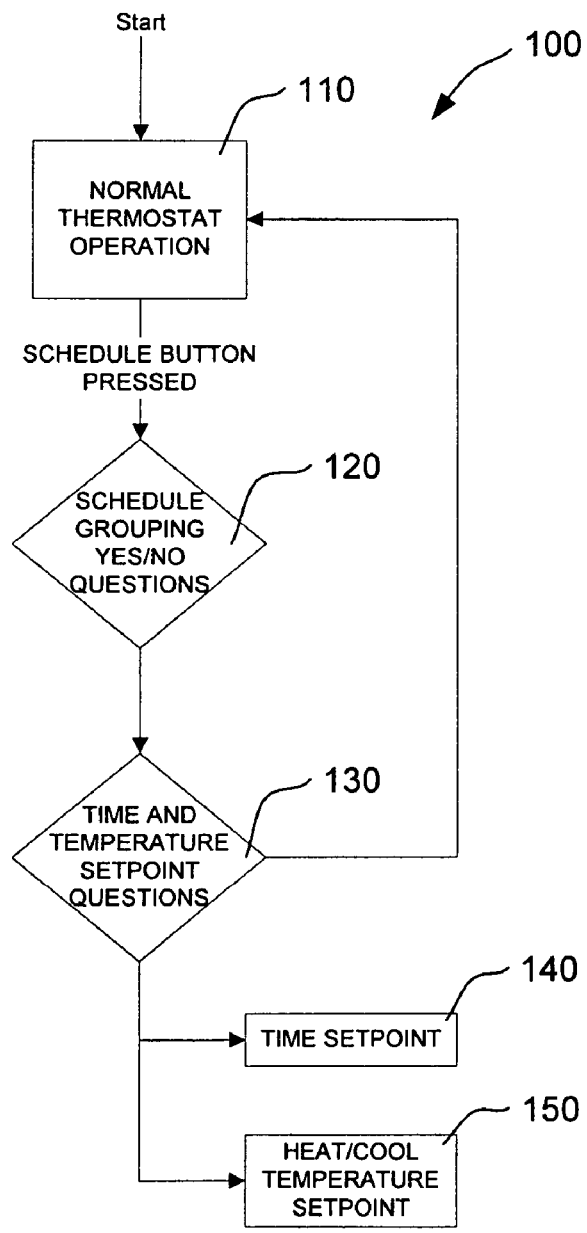
FIG. 1 is a flow diagram of an illustrative HVAC interview program.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION OF THE INVENTION

The following description should be read with reference to the drawings, in which like elements in different drawings are numbered in like fashion. The drawings, which are not necessarily to scale, depict selected embodiments and are not intended to limit the scope of the invention. Although examples of construction, dimensions, and materials are illustrated for the various elements, those skilled in the art will recognize that many of the examples provided have suitable alternatives that may be utilized.

Generally, the present invention pertains to simplified interfaces for controllers having interview programming capabilities. These controllers can be used in a variety of systems such as, for example, HVAC systems, water heater systems, water softener systems, sprinkler systems, security systems, lighting systems, and the like. The Figures depict HVAC controllers. While the present invention is not so limited, an appreciation of various aspects of the invention will be gained through a discussion of the examples provided below.

FIG. 1 is a flow diagram of an illustrative HVAC interview program 100. The flow diagram starts at a normal thermostat operation block 110. Normal thermostat operation block 110 can be an initial parameter setting operation or a modification of parameter settings. Interview scheduling block 120, 130 provides one or more interview questions to a user via the user interface. The user interface can accept one or more responses to the one or more interview questions from the user via the user interface. The schedule is then built or modified, in some cases by adding or modifying one or more schedule parameters 140, 150, based on the user responses provided via the user interface. Once the schedule parameters 140, 150 are modified, the controller can return to the normal operation block 110, and follow the new schedule.

In some embodiments, the interview scheduling blocks 120 and 130 can provide interview questions that elicit an affirmative (e.g., "yes") or negative (e.g., "no") user response. Alternatively, or in addition, the interview scheduling blocks 120, and 130 can provide include interview questions that allow a user to select one (or more) answers from a predetermined list of answers.

In some embodiments, these interview questions can solicit information from the user regarding the grouping of the controller set points entered or the temporal relationship of the controller set points such as, for example, the interview question may ask "Do you want the schedule to apply to every day of the week?", requiring the user to respond with a "YES" or "NO" answer. The interview scheduling block 120 preferably includes questions that are natural language questions, which may be phrases that have one, two, three, four, five, six, or seven or more words, although this is not required in all embodiments.

Alternatively, or in addition, interview scheduling block 130 can provide interview questions that require a numerical user response. For example, these interview questions can solicit information from the user regarding the specific time and temperature set points for each grouping of controller set points solicited by the interview block 120 described above. Interview block 130 can provide a question such as, for example, "What is a comfortable sleeping temperature in the winter?", requiring the user to respond with a numerical temperature answer. Like interview schedule block 120 above, interview scheduling block 130 can include questions that are natural language questions, which may be phrases that have one, two, three, four, five, six, or seven or more words, although this is not required in all embodiments.

The interview scheduling blocks 120 and 130 can provide one or more interview questions about, for example, which weekdays will have the same schedule?, when a first person wakes up?, when a last person goes to sleep?, when a last person leaves during the day?, when a first person arrives home?, what a comfortable temperature is when heat is on?, what a comfortable temperature is when air conditioning is on?, what a comfortable sleeping temperature is in summer?, and/or what a comfortable sleeping temperature is in winter?

Alternatively, or in addition, the interview scheduling blocks 120 and 130 may provide one or more interview questions that provide a plurality of predetermined answers or responses (e.g., multiple choice format) where the user selects an answer or response. For example, the interview question may provide a question such as, "What type of schedule do you desire?" In this illustrative embodiment, a series of predetermined responses or answers can be provided such as, "Every day of the week is the same," "Weekdays are the same and Saturday/Sunday is the same," "Weekday are the same and Saturday/Sunday is different," "Each Weekday is different and Saturday/Sunday is the same," and "Each day of the week is different."

Alternatively, or in addition, once an initial schedule has been built, the interview scheduling blocks 120, and 130 can display a previous answer that was accepted by the user interface based on the prior built schedule. This illustrative feature can provide the user with a convenient option to select and alter only the schedule parameters 140, 150 that the user desires to modify. This feature can be utilized in all illustrative embodiments described herein, however it is not required.

Figure 2:
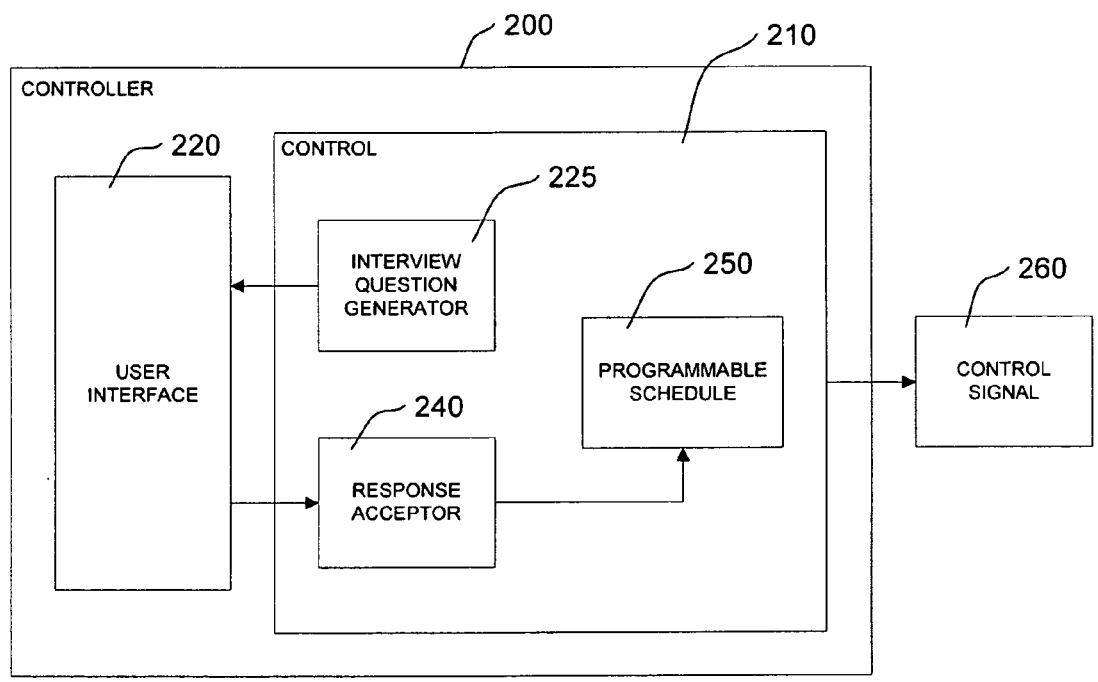
FIG. 2 is a block diagram of the illustrative HVAC interview program shown in FIG. 1.

FIG. 2 is a block diagram of the illustrative HVAC controller with an illustrative interview function similar to that shown in FIG. 1. Controller 200 includes a control module 210 that can be a microprocessor or the like. The control module 210 communicates with a user interface 220, and can include an interview question generator 225, a response acceptor 240 and a programmable schedule 250. The control module 210 can also generate a control signal 260 to a device (not shown), such as an HVAC system or device.

In an illustrative embodiment, the interview question generator 225 provides interview questions, such as those described above, to the user interface 220. The user interface 220 can be any form of user interface such as, for example, a physical interface including a touchscreen, an LCD with buttons, and/or an aural interface including a speaker and microphone, or any other suitable user interface. A user can activate the interview question generator 225 by any suitable mechanism, such as by pressing a schedule button on a touchscreen of the user interface 220. Alternatively, or in addition, the controller 210 may activate the interview question generator 225 on its own, such as when it believes additional scheduling information is needed or might otherwise be desired. In response to questions posed by the interview question generator 225, the user can enter one or more user responses into the user interface 220. The response acceptor 240 accepts the user responses and provides the response to the programmable schedule 250. In some embodiments, the programmable schedule 250 has a number of time and temperature set points that can be entered or modified by the response acceptor 240. Once the schedule is built and/or modified, a control signal 260 is generated by the control module 210 based on the programmable schedule 250.

Figure 3:
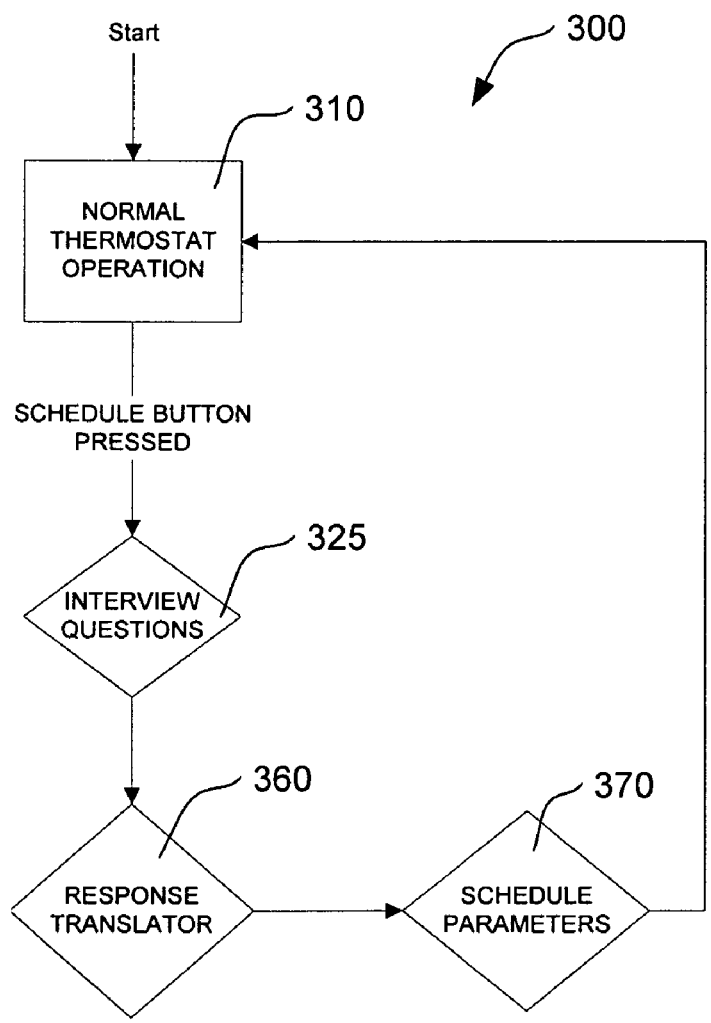
FIG. 3 is a flow diagram of another illustrative HVAC interview program.

FIG. 3 is a flow diagram of another illustrative HVAC interview program 300. The flow diagram starts at a normal thermostat operation block 310. Normal thermostat operation block 310 can be an initial parameter setting operation or a modification of parameter settings. Interview scheduling block 325 provides one or more interview questions to a user via a user interface. The user interface then accepts one or more responses to the one or more interview questions from the user via the user interface. A user response translator 360 translates the one or more user responses to form a translated response. One or more schedule parameters 370 are then modified based on the translated responses from the response translator 360. Once the schedule parameters 370 are modified, the controller can return to the normal operation block 310.

In some embodiments, the interview scheduling block 325 includes interview questions that require an affirmative (e.g, "yes") or negative (e.g., "no") user response. In addition, the interview questions can solicit information from the user regarding the grouping of the controller set points entered or the temporal relationship of the controller set points. For example, the interview question may ask "Do you want the schedule to apply to every day of the week?", requiring the user to respond with a "YES" or "NO" answer. The interview scheduling block 325 can include questions that are natural language questions such as, for example, phrases that can have one, two, three, four, five, six, or seven or more words.

In an illustrative embodiment, interview scheduling block 325 may also provide interview questions that require a numerical user response. These interview questions can solicit information from the user regarding the specific time and temperature set points for each grouping of controller set points solicited by the interview block 325 described above. The interview block 325 can provide a question such as, for example, "What is a comfortable sleeping temperature in the winter?", requiring the user to respond with a numerical temperature answer. The interview scheduling block 325 can include questions that are natural language questions such as, for example, phrases that can have one, two, three, four, five, six, or seven or more words.

In the illustrative embodiment, the interview scheduling block 325 can also provide one or more interview questions related to, for example, which weekdays will have the same schedule?, when a first person wakes up?, when a last person goes to sleep?, when a last person leaves during the day?, when a first person arrives home?, what a comfortable temperature is when heat is on?, what a comfortable temperature is when air conditioning is on?, what a comfortable sleeping temperature is in the summer?, or what a comfortable sleeping temperature is in the winter?

The response translator 360 can translate the user responses to create appropriate schedule parameters 370 that help define the schedule of the controller. That is, the response translator 360 applies the user responses to one or more interview questions to establish the controller schedule. For example, the response translator 360 can take an affirmative user response to the interview question, "Do you want the same schedule for Saturday and Sunday?" and correlate with the interview question, "What temperature do you like when the heat is on?" to establish the schedule parameters for the heating temperature during at least selected periods on Saturday and Sunday.

Alternatively, or in addition, the interview scheduling block 325 may provide one or more interview questions that provide a plurality of predetermined answers or responses (e.g., multiple choice format) where the user selects an answer or response. For example, the interview question may provide a question such as, "What type of schedule do you desire?" In this illustrative embodiment, a series of predetermined responses or answers can be provided such as, "Every day of the week is the same," "Weekdays are the same and Saturday/Sunday is the same," "Weekday are the same and Saturday/Sunday is different," "Each Weekday is different and Saturday/Sunday is the same," and "Each day of the week is different."

Figure 4A:
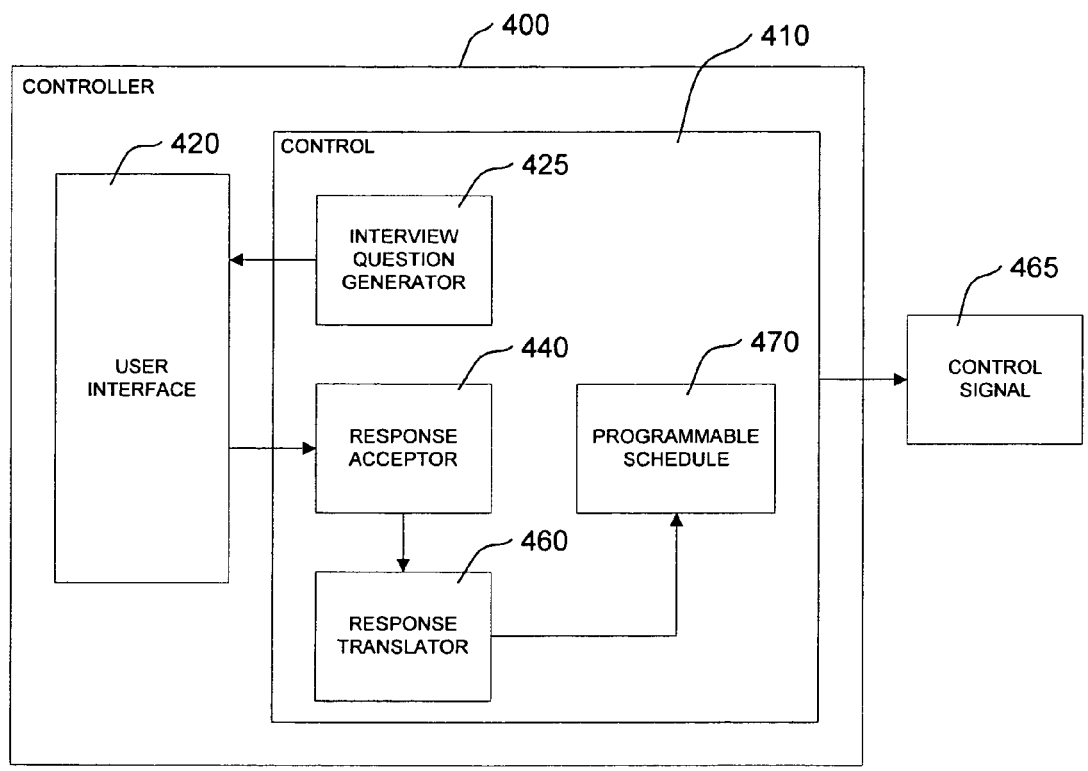
FIG. 4A is a block diagram of the illustrative HVAC interview program shown in FIG. 3.

FIG. 4A is a block diagram of the illustrative HVAC controller with an illustrative interview function similar to that shown in FIG. 3. Controller 400 includes a control module 410 that can be a microprocessor or the like. The control module 410 communicates with a user interface 420, and may include an interview question generator 425, a response acceptor 440, a response translator 460, and a programmable schedule 470. The control module 410 can also generate a control signal 465 to a device (not shown), such as an HVAC system or device.

In the illustrative embodiment, the interview question generator 435 provides interview questions, such as those described above, to the user interface 420. The user interface 420 can be any form of user interface such as, for example, a physical interface including a touchscreen, an LCD with buttons, and/or an aural interface including a speaker and microphone, or any other suitable user interface. A user can activate the interview question generator 435 by any suitable mechanism, such as by pressing a mechanical schedule button on the controller, touching an appropriate region of a touchscreen, voice activation, etc. Alternatively, or in addition, the controller 410 may activate the interview question generator 425 on its own, such as when it believes additional scheduling information is needed or might otherwise be desired. In response to questions posed by the interview question generator 425, the user can enter one or more user responses into the user interface 420. The response acceptor 440 accepts the user responses and provides the response to the response translator 460. The response translator 460 provides a translated response to a programmable schedule 470. In some embodiments, the programmable schedule 470 has a number of time and temperature set points that can be entered or modified by the response translator 470. Once the schedule is built and/or modified a control signal 465 is generated by the control module 410 based on the programmable schedule 470.

Figure 4B:
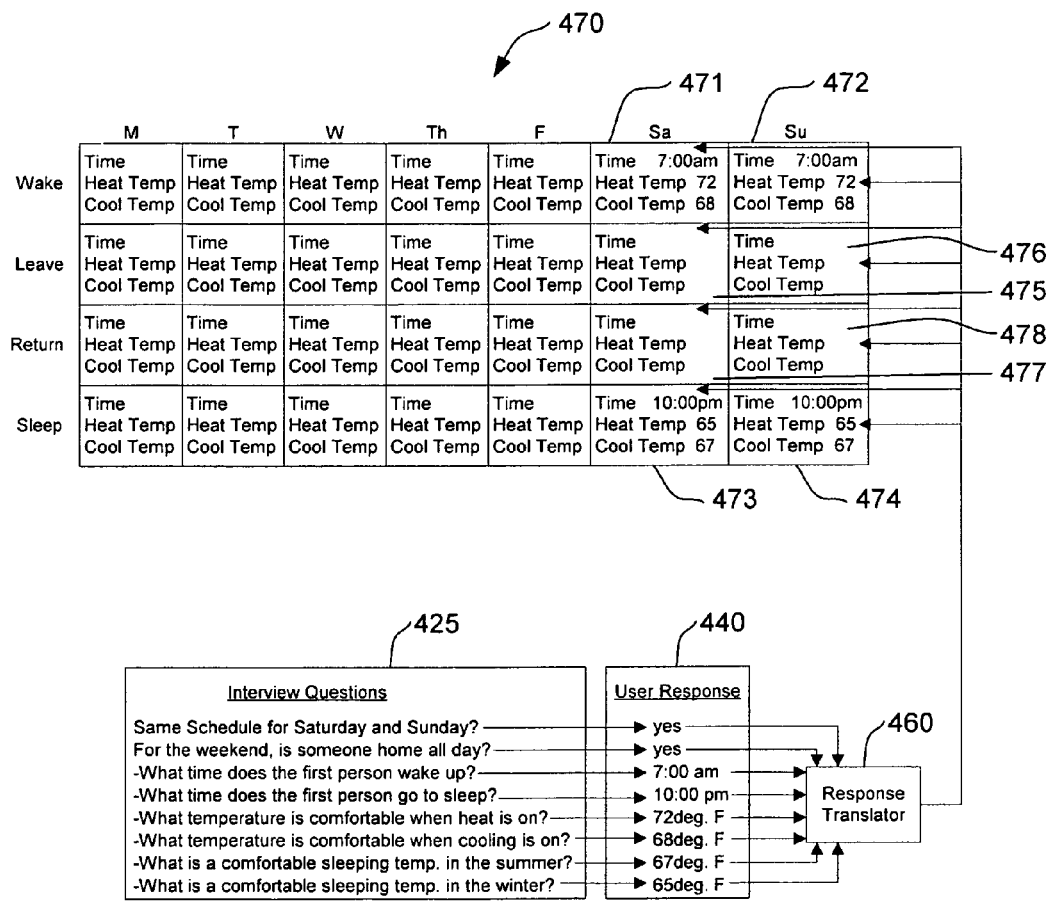
FIG. 4B is an illustrative partial block diagram of the block diagram shown in FIG. 4A.

FIG. 4B is an illustrative partial block diagram of the block diagram shown in FIG. 4A showing one embodiment of the interaction of the interview question generator 425, response acceptor 440, response translator 460 and programmable schedule 470. The illustrative programmable schedule 470 has a plurality of cells such as, for example, a Saturday wake cell 471, a Sunday wake cell 472, a Saturday sleep cell 473, and a Sunday sleep cell 474. In this embodiment, each cell 471, 472, 473, 474 may include a number of schedule parameters such as, for example, a start time, a heat temperature and a cool temperature.

Interview questions 425 are posed to the user. As shown in the illustrative example: an interview question 425 of "Same schedule for Saturday and Sunday?" elicits an user response 440 of "YES"; an interview question 425 of "For the weekend, is someone home all day?" elicits an user response 440 of "YES"; an interview question 425 of "What time does the first person wake up?" elicits an user response 440 of "7:00 a.m."; an interview question 425 of "What time does the last person go to sleep?" elicits an user response 440 of "10:00 p.m."; an interview question 425 of "What temperature is comfortable when the heat is on?" elicits an user response 440 of "72° F."; an interview question 425 of "What temperature is comfortable when the air conditioning is on?" elicits an user response 440 of "68° F."; an interview question 425 of "What is a comfortable sleeping temperature in summer?" elicits an user response 440 of "67° F."; and an interview question 425 of "What is a comfortable sleeping temperature in winter?" elicits an user response 440 of "65° F.".

In the illustrative embodiment, the response translator 460 accepts the user responses provided in block 440. The response translator 460 then builds and/or modifies the programmable schedule 470. In the illustrative embodiment, each cell 471, 472, 473, 474 includes a start time, a heat temperature and a cool temperature. The Saturday wake cell 471 and the Sunday wake cell 472 has a start time of 7:00 a.m., a heat temperature of 72° F., and a cool temperature of 68° F., all of the times and temperatures are provided by the response translator. The Saturday sleep cell 473 and the Sunday sleep cell 474 has a start time of 10:00 p.m., a heat temperature of 65° F., and a cool temperature of 67° F., all of the times and temperatures are provided by the response translator.

In this illustrative embodiment, the response translator 460 takes a plurality of user responses 440 to the interview questions 425 and builds and/or modifies a plurality of schedule parameters. The Saturday and Sunday Leave and Return cells 475, 476, 477, and 478 are ignored and/or zeroed out by the response translator 460 since they are not required based on the user responses 425 for this example.

Figure 5:
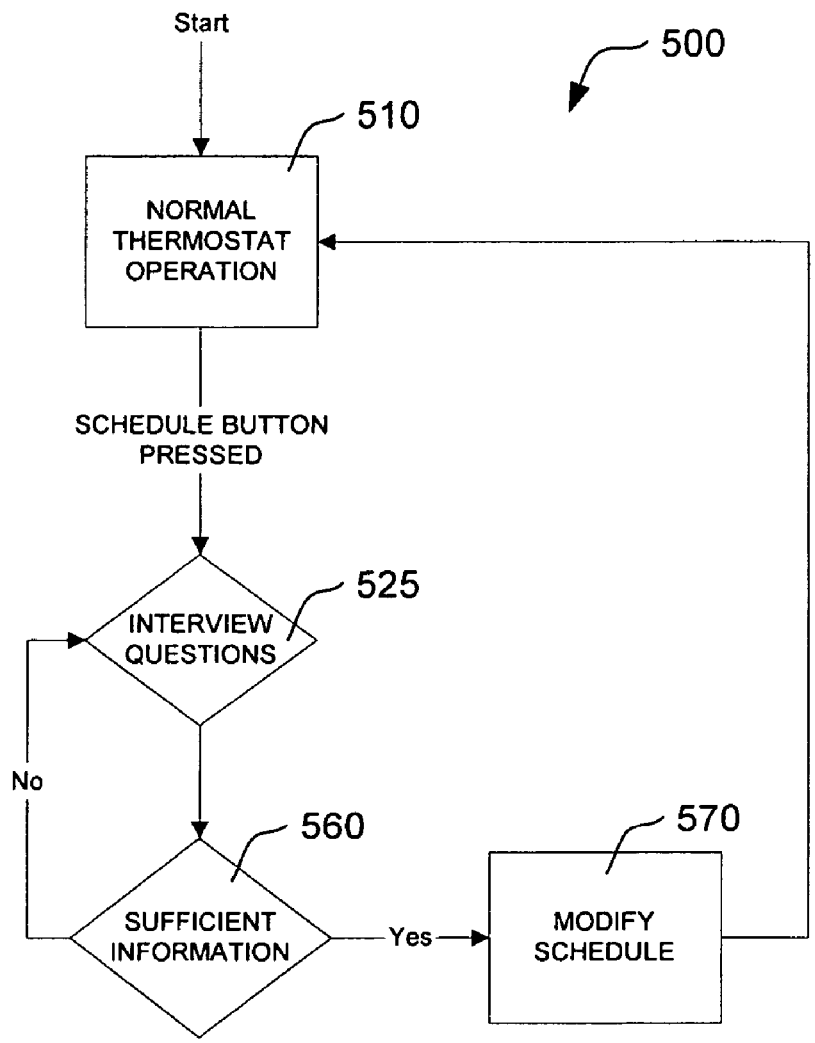
FIG. 5 is a flow diagram of another illustrative HVAC interview program.

FIG. 5 is a flow diagram of another illustrative HVAC interview program 500. The flow diagram starts at a normal thermostat operation block 510. Normal thermostat operation block 510 can be an initial parameter setting operation or a modification of parameter settings. Interview scheduling block 525 provides one or more interview questions to a user via a user interface. The user interface then accepts one or more responses to the one or more interview questions from the user via the user interface. A sufficient information block 560 determines if enough information has been solicited from the user response to the interview questions sufficient to build or modify the schedule at block 570. If not, the interview scheduling block 525 provides another interview question to the user via the user interface. If the sufficient information block 560 determines that enough information has been solicited, then the schedule is built or modified by the modify schedule block 570. Once the schedule is built or modified by the modify schedule block 570, the controller can return to the normal operation block 510.

The sufficient information block 560 can, for example, help ensure that a sufficient number of schedule parameters are defined, such as, for example, a start time, a heating temperature and a cooling temperature for a particular time period such as, for example, a specific day or group of days wake period, leave period, return period and/or sleep period, as shown in FIG. 4B.

In some embodiments, the interview scheduling block 525 provides a number of predetermined interview questions in a predetermined sequential order. The number of questions or queries may be adapted to collect information from the user responses to generate at least a portion of the schedule parameters.

Like above, the interview scheduling block 525 can include interview questions that require an affirmative (e.g., "yes") or negative (e.g., "no") user response. For example, interview scheduling block 525 can provide interview questions solicit information from the user regarding the grouping of the controller set points entered or the temporal relationship of the controller set points such as, for example, "Do you want the schedule to apply to every day of the week?", requiring the user to respond with a "YES" or "NO" answer. The interview scheduling block 525 can include questions that are natural language questions which can be phrases that have one, two, three, four, five, six, or seven or more words in length.

Alternatively or in addition, interview scheduling block 525 can provide interview questions that require a numerical user response. For example, these interview questions can solicit information from the user regarding the specific time and temperature set points for each grouping of controller set points solicited by the interview block 525 described above. The interview block 525 can provide a question such as, for example, "What is a comfortable sleeping temperature in the winter?", requiring the user to respond with a numerical temperature answer. Again, the interview scheduling block 525 can include questions that are natural language questions that can be phrases which can be one, two, three, four, five, six, seven or more words, although this is not required in all embodiments.

The interview scheduling block 525 may also provide one or more interview questions about, which weekdays will have a same schedule?, when a first person wakes up?, when a last person goes to sleep?, when a last person leaves during the day?, when a first person arrives home?, what a comfortable temperature is when heat is on?, what a comfortable temperature is when air conditioning is on?, what a comfortable sleeping temperature is in the summer?, or what a comfortable sleeping temperature is in the winter?

Alternatively, or in addition, the interview scheduling block 525 may provide one or more interview questions that provide a plurality of predetermined answers or responses (e.g., multiple choice format) where the user selects an answer or response. For example, the interview question may provide a question such as, "What type of schedule do you desire?" In this illustrative embodiment, a series of predetermined responses or answers can be provided such as, "Every day of the week is the same," "Weekdays are the same and Saturday/Sunday is the same," "Weekday are the same and Saturday/Sunday is different," "Each Weekday is different and Saturday/Sunday is the same," and "Each day of the week is different."

Figure 6:
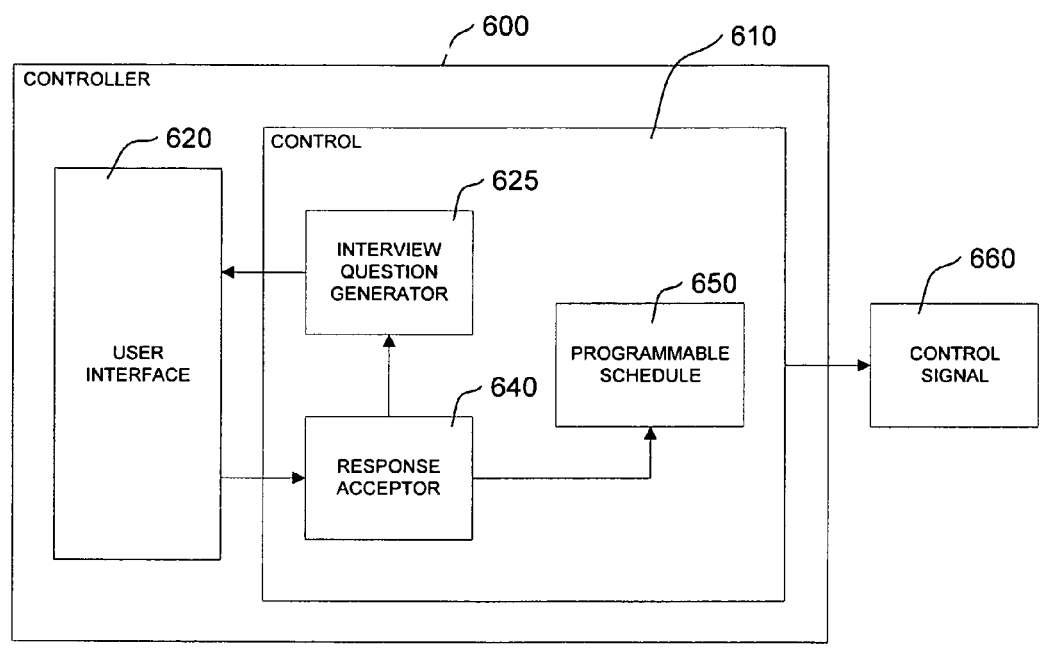
FIG. 6 is a block diagram of the illustrative HVAC interview program shown in FIG. 5.

FIG. 6 is a block diagram of the illustrative HVAC controller with an illustrative interview function similar to that shown in FIG. 5. Controller 600 includes a control module 610 that can be a microprocessor or the like. The control module 610 communicates with a user interface 620, and may include an interview question generator 625, a response acceptor 640 and a programmable schedule 650. The control module 610 can also generate a control signal 660 to a device (not shown), such as an HVAC system or device.

In the illustrative embodiment, the interview question generator 625 provides interview questions, such as those described above, to the user interface 620. The user interface 620 can be any form of user interface such as, for example, a physical interface including a touchscreen, an LCD with buttons, an aural interface including a speaker and microphone, or any other suitable user interface. A user can activate the interview question generator 625 by any suitable mechanism, such as by pressing a schedule button on a touchscreen of the user interface 620. Alternatively, or in addition, the controller 610 may activate the interview question generator 625 on its own, such as when it believes additional scheduling information is needed or might otherwise be desired. In response to the questions posed by the interview question generator 625, the user can enter one or more user responses into the user interface 620. The response acceptor 640 accepts the user responses and provides the responses to the programmable schedule 650 if it determines that sufficient information has been provided by the user responses to establish a program schedule. If not, the response acceptor 640 instructs the interview question generator 625 to provide another interview question to the user via the user interface 620. Once the response acceptor 640 determines that sufficient information has been provided by the user to establish a program schedule 650 the program schedule 650 is built and/or modified. In some embodiments, the programmable schedule 650 has a number of time and temperature set points that can be entered or modified by the response acceptor 640. Once the programmable schedule 650 is built and/or modified, a control signal 660 is generated by the control module 610 based on the programmable schedule 650.

Figure 7A:
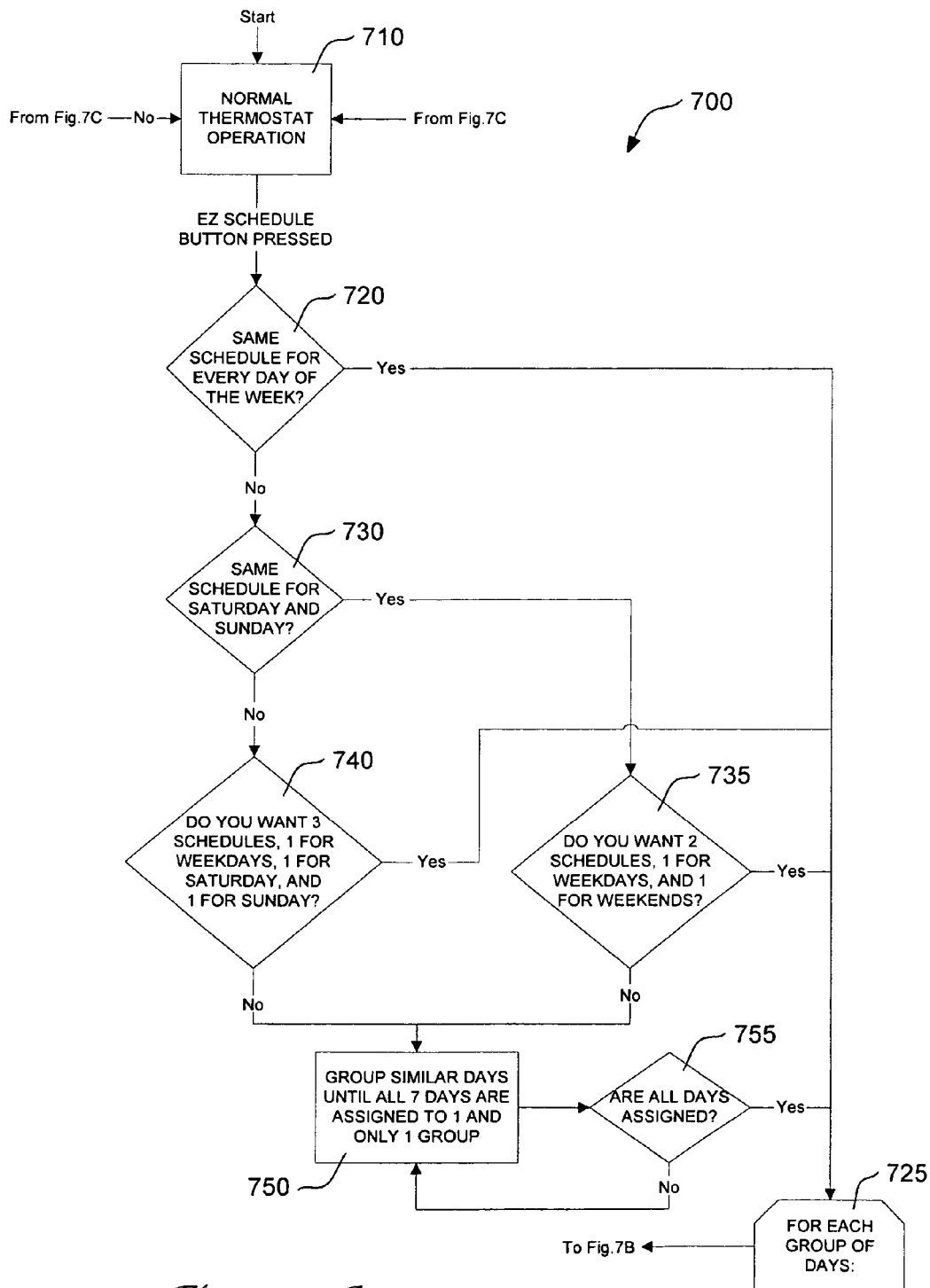
FIGS. 7A–C are flow diagrams of another illustrative HVAC interview program.
Figure 7B:
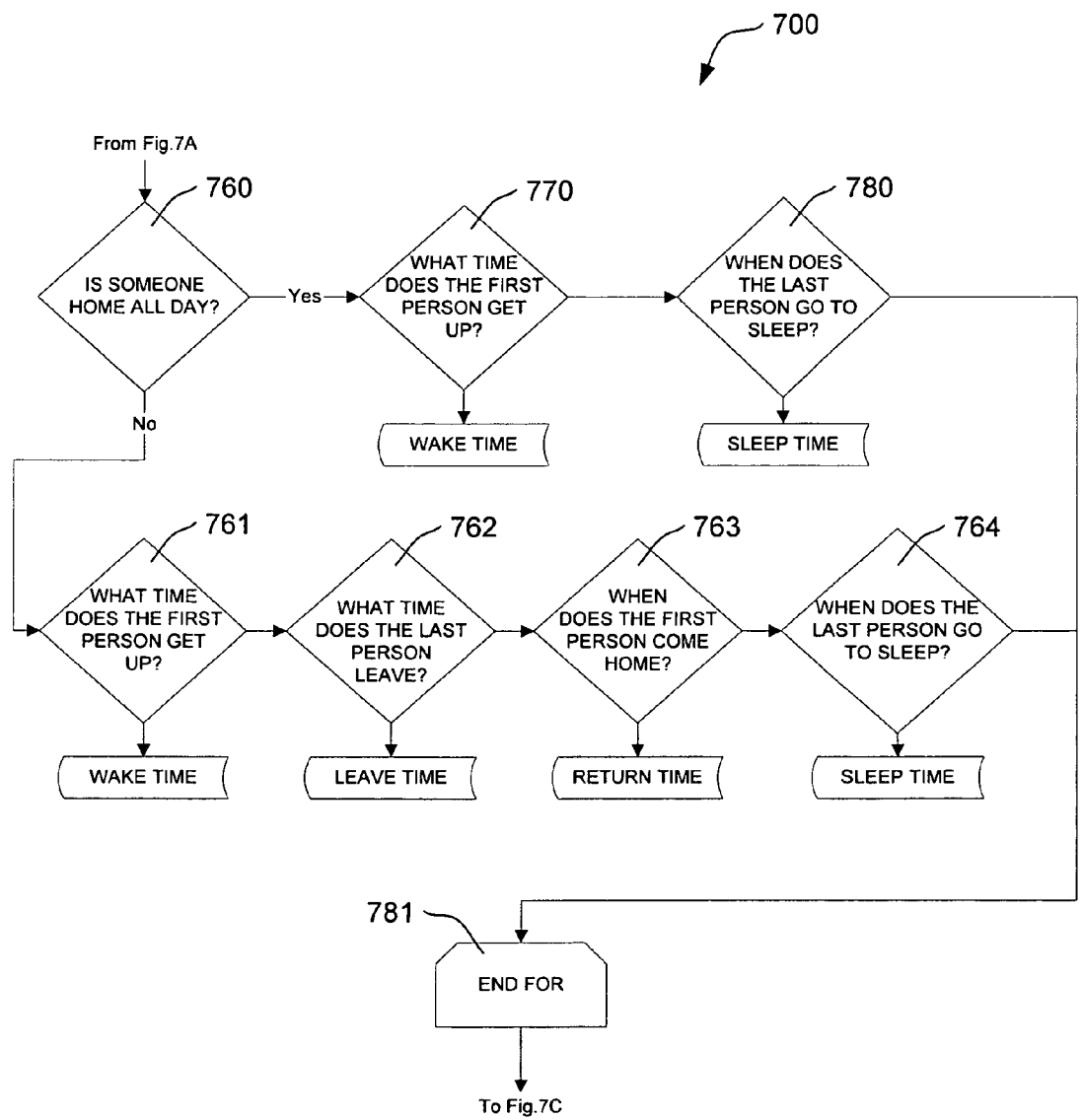
Figure 7C:
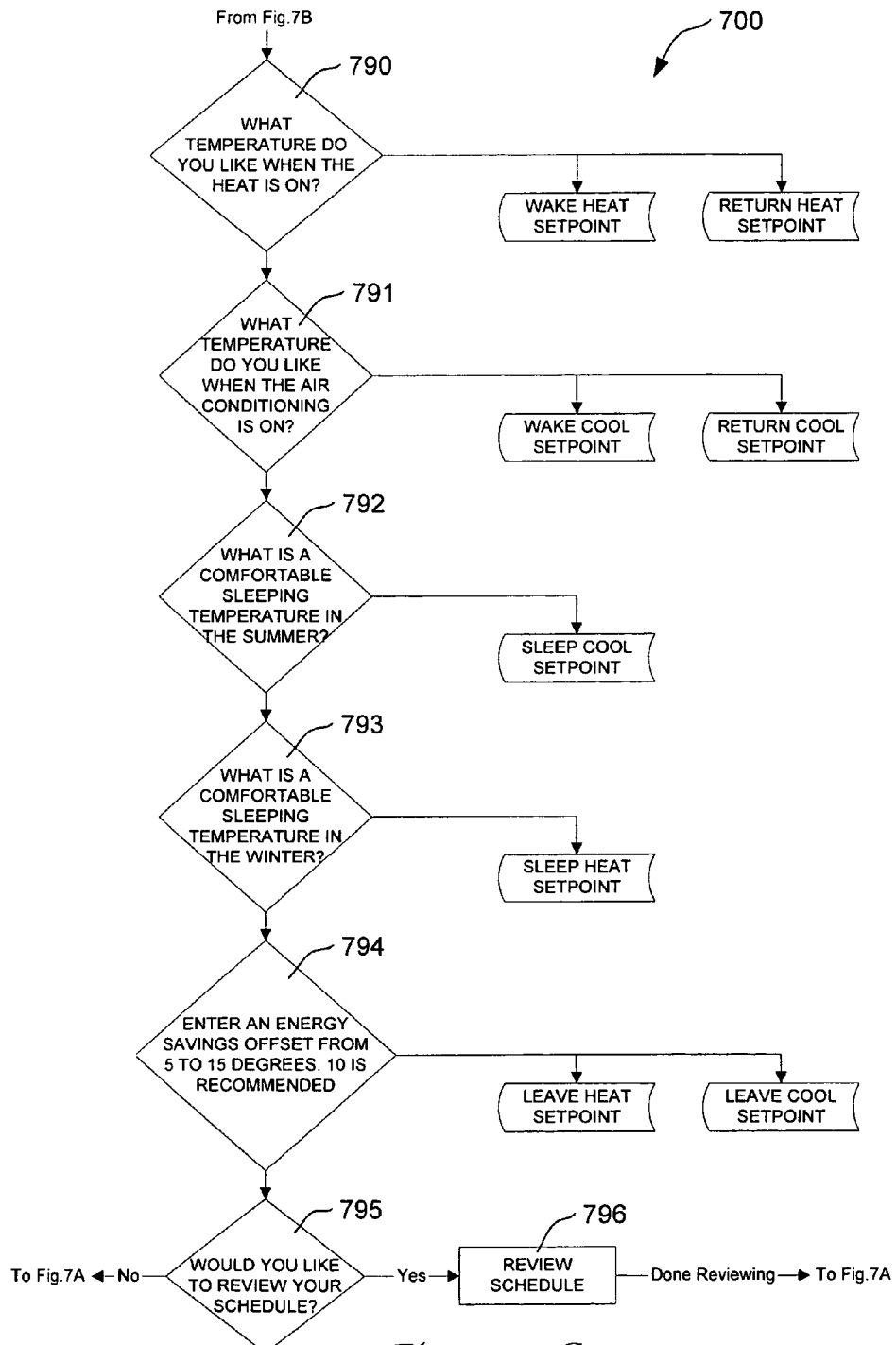

FIGS. 7A–C are flow diagrams of another illustrative HVAC interview program 700. The flow diagram starts at a normal thermostat operation block 710, but this is not required in all embodiments. In the illustrative embodiment, the interview program 700 can be initiated by pressing a program initiation button or key such as, for example, an "EZ Schedule" button.

The program can begin by asking whether the user wants the same schedule to be used for every day of the week, as shown at block 720. If the user responds with a "YES" response, then the program can move to ask context questions for that group of days, as shown at block 725, which may set the schedule for the week assuming the same schedule for every 24 hour period or day. If the user responds with a "NO" response, the program may ask the user if the same schedule applies to both weekend days, Saturday and Sunday, as shown at block 730. If the user responds with a "YES" response, then the program can ask if the user wants two schedules, one for weekdays and one for weekends, as shown at block 735. A "YES response to block 735 can move the program to asking context questions for a weekend group of days and a weekdays group of days, as shown at block 725, to set the schedule for the week assuming a first schedule for weekend days and a second schedule for weekdays. A "NO" response to block 730 can cause the program to ask whether the user wants three schedules including a weekday schedule, a Saturday schedule, and a Sunday schedule, as shown at block 740. A "YES" response to block 740 moves the program to asking context questions for a week day group of days schedule, a Saturday schedule and a Sunday schedule, as shown at block 725, to set the schedule for the week assuming a first schedule for weekdays, and a second schedule for Saturday and a third schedule for Sundays. A "NO" response to either block 740 or block 735 moves the program to asking the user to group each day of the seven days of the week into similar schedule groupings until all days are assigned to one group, as shown at block 750. The program can ask if all days are assigned at block 755, with a "NO" response returning the user to block 750 to assign a non-assigned day or days until all days have been assigned. Once all days have been assigned to a group, the program moves to asking context questions for each group of days schedule, as shown at block 725, to set the schedule for the each grouping of days assuming a first schedule for a first group, a second schedule for a second group, a third schedule for a third group and so on until all groupings of days are scheduled.

The program 700 can ask a variety of context sensitive question to determine the desired schedule for each grouping of days identified by the program 700 above. For example, and as shown in FIG. 7B, the program 700 can inquire whether someone is home all day, as shown at block 760. If the user enters a "YES" response to block 760, the program can ask when the first person gets and request that the user to enter a wake time, as shown at block 770. Then the program 700 can ask when the last person goes to sleep and request that the user to enter a sleep time, as shown at block 780. If the user enters a "NO" response to block 760, the program can ask when the first person gets up, and request that the user to enter a wake time, as shown at block 761. Then the program can ask what time the first person leaves home and request that the user enter a leave time, as shown at block 762. The program can also ask when the last person gets home for the day, and request the user to enter a return time, as shown at block 763. The program can also ask when the last person goes to sleep, and request that the user enter a sleep time, as shown at block 764. Once all the above information has been entered by the user for each grouping of days, the program may move to an end block 781.

The program 700 can then request information from the user regarding comfortable awake, sleeping and away temperatures. For example, and referring to FIG. 7C, the program can request that the user enter a comfortable temperature when the heat is on, as shown at block 790. The temperature information received in block 790 can be automatically inserted into a program schedule for each grouping of days to set the wake heat and return heat set points. The program can also request that the user enter a comfortable temperature when the air conditioning is on, as shown at block 791. This information can be automatically inserted into a program schedule for each grouping of days to set the wake cool and return cool set points. This illustrative program can also request that the user enter a comfortable summer sleeping temperature, as shown at block 792. This information can be automatically inserted into a program schedule for each grouping of days to set the sleep cool set point. The program can also request that the user enter a comfortable winter sleeping temperature, as shown at block 793. This information can be automatically inserted into a program schedule for each grouping of days to set the sleep heat set point. The program can also request that the user to enter an energy savings offset at block 794. This information can be automatically inserted into a program schedule for each grouping of days to set the leave cool and leave heat set points.

In some embodiments, the program 700 can allow the user to request a schedule review at block 795, which can allow the user to review the built or modified schedule, as shown at block 796. If the user does not wish to review the schedule or when the user is done reviewing the schedule, the program returns to normal thermostat operation block 710 operation under the newly built or modified schedule.

Figure 8A:
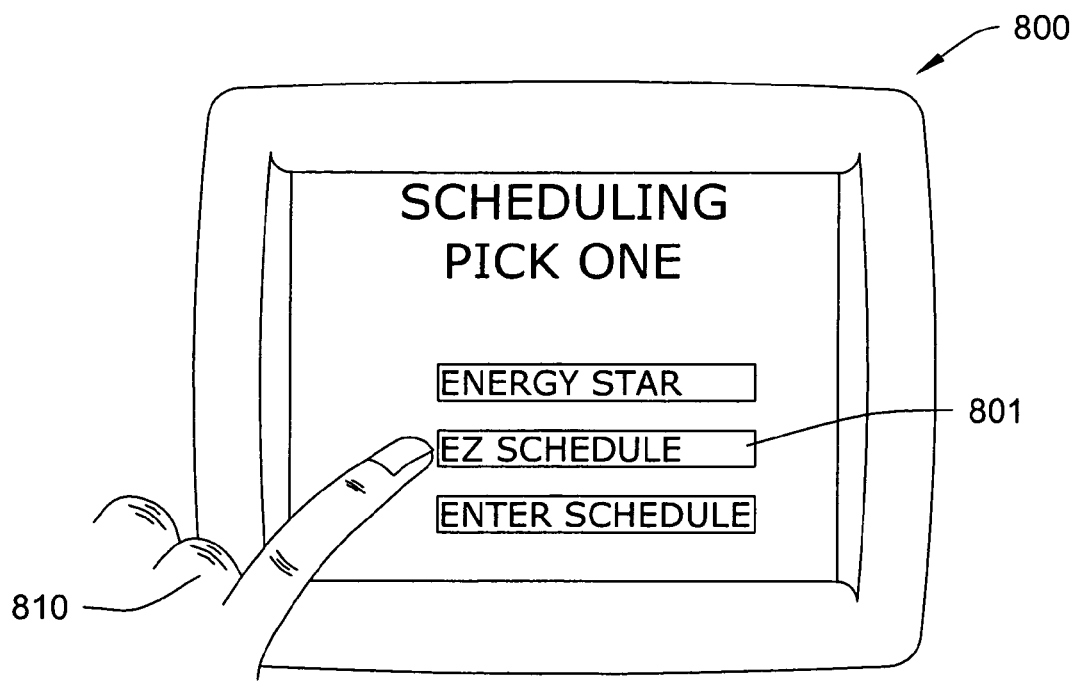
FIGS. 8A–T are schematic drawings of an illustrative HVAC interface showing an embodiment of the flow diagram of the illustrative HVAC interview program shown in FIG. 7.
Figure 8B:
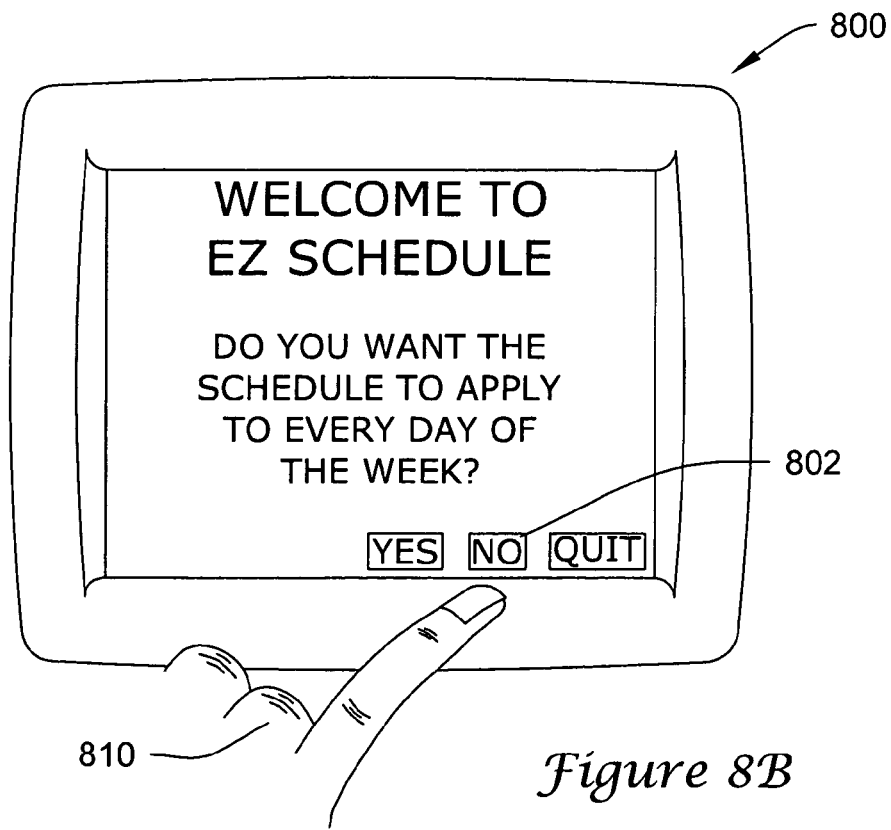
Figure 8C:
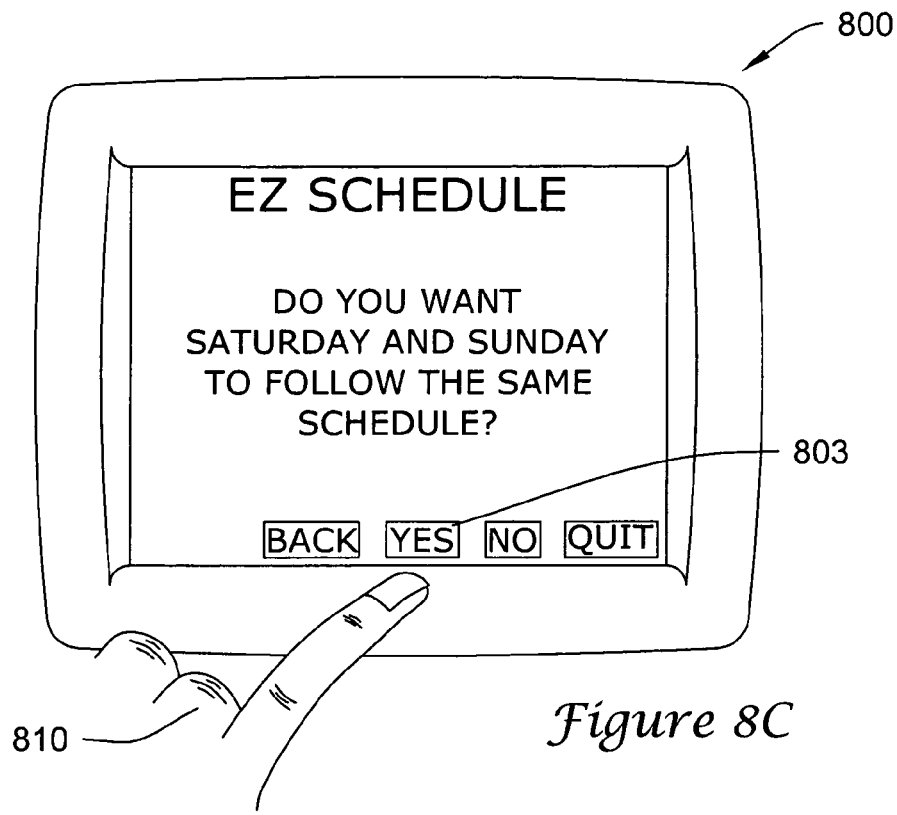
Figure 8D:
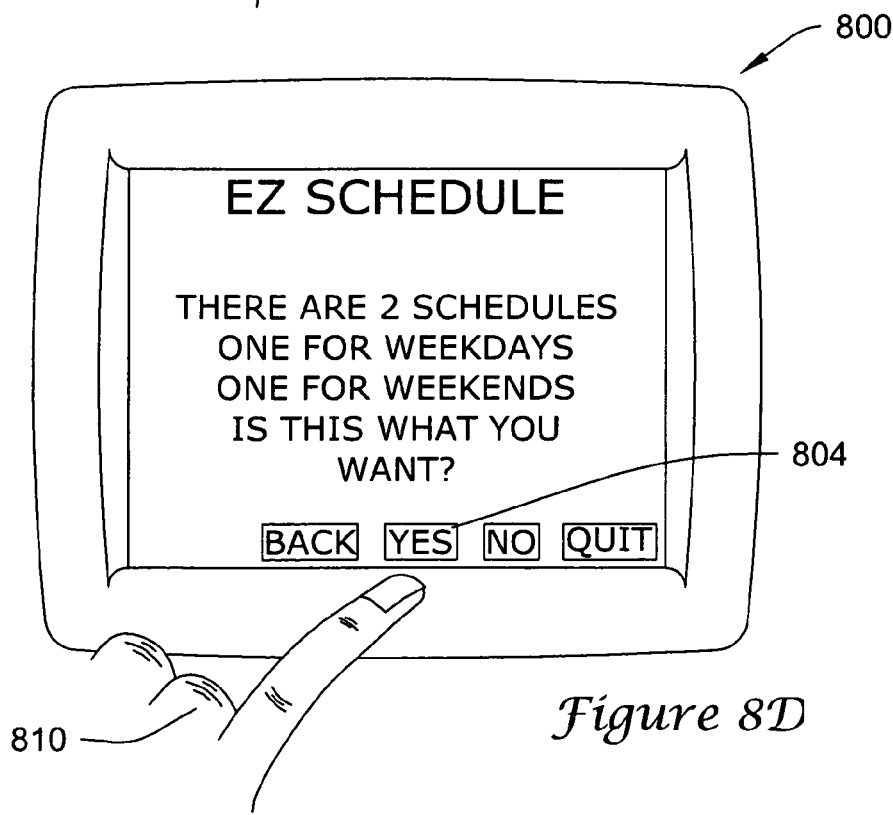
Figure 8E:
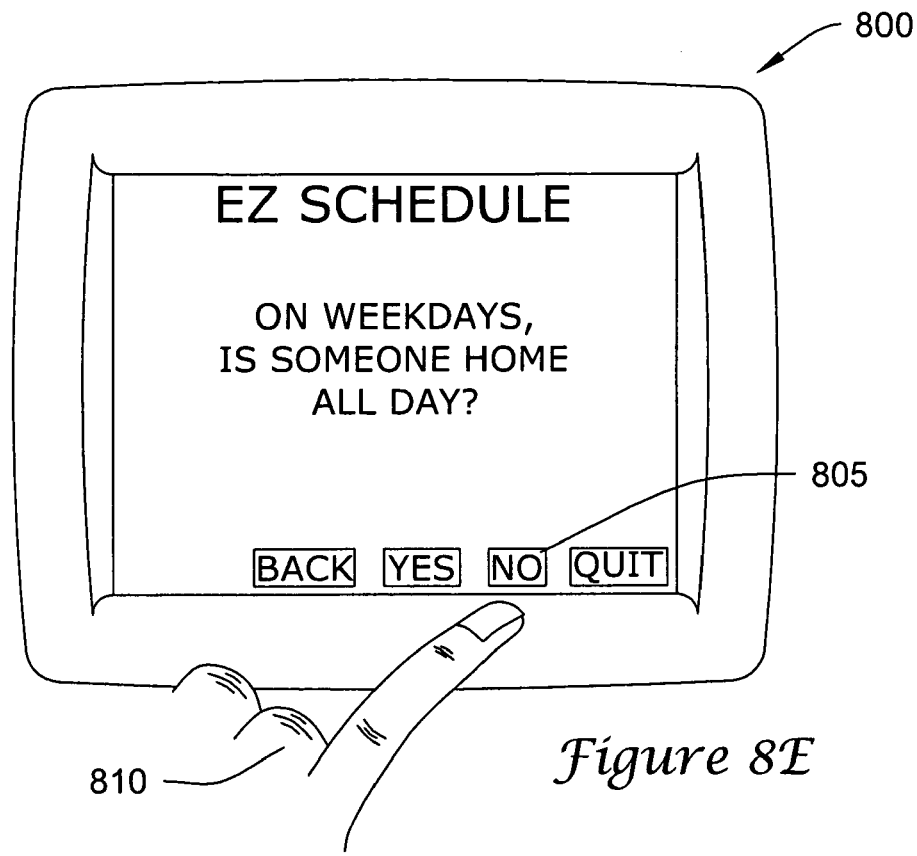
Figure 8F:
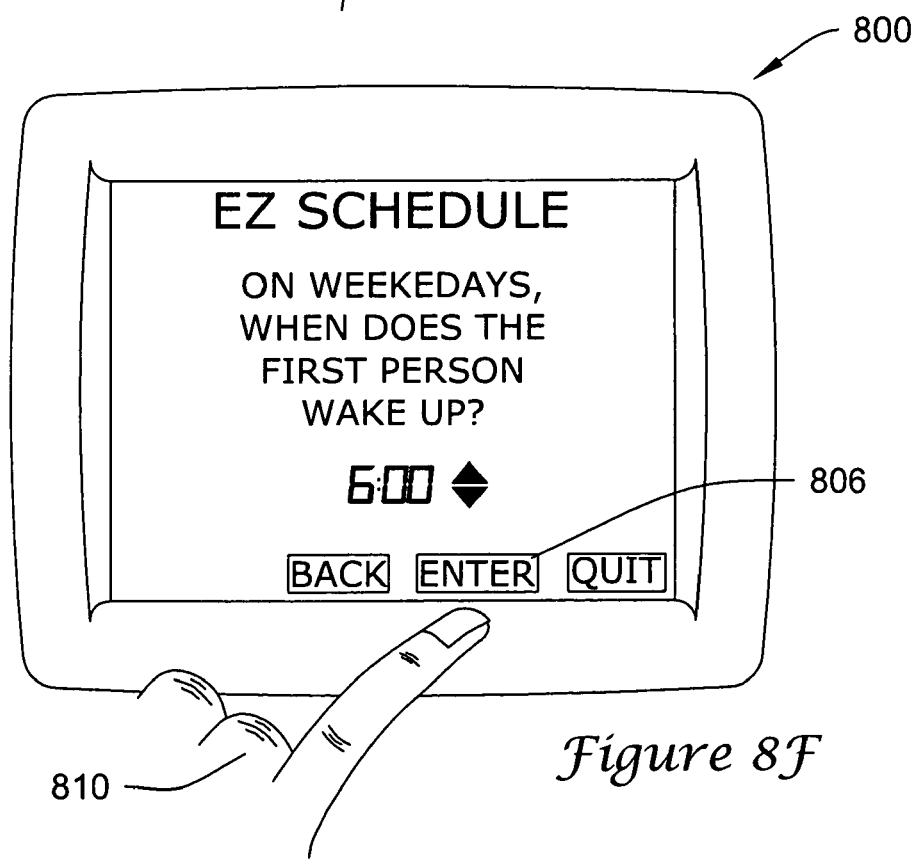
Figure 8G:
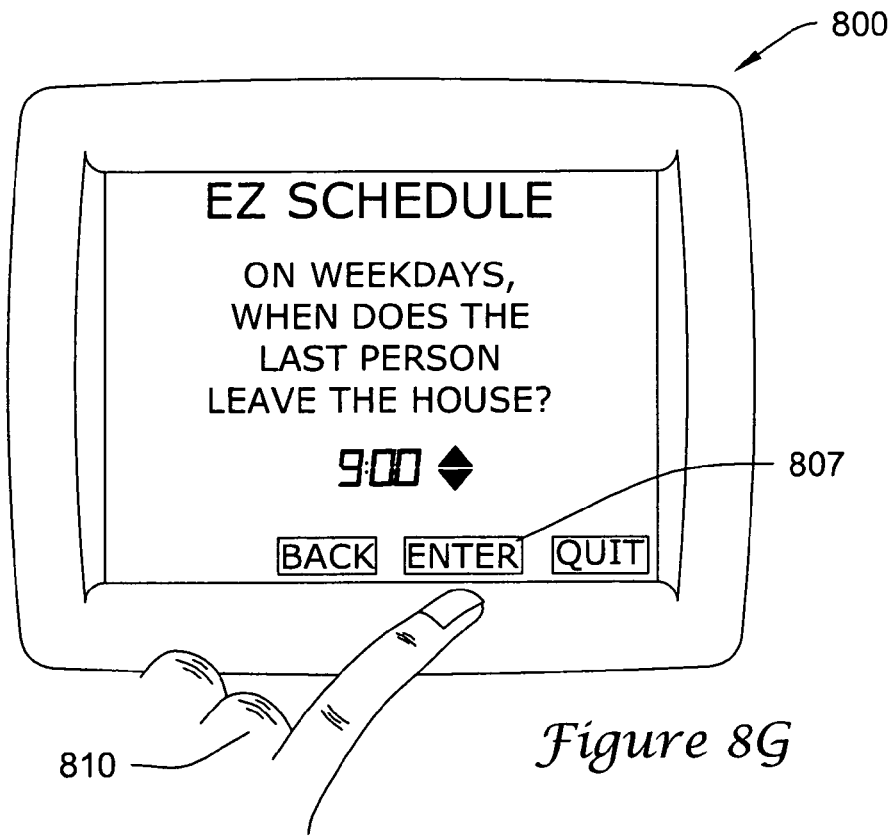
Figure 8H:
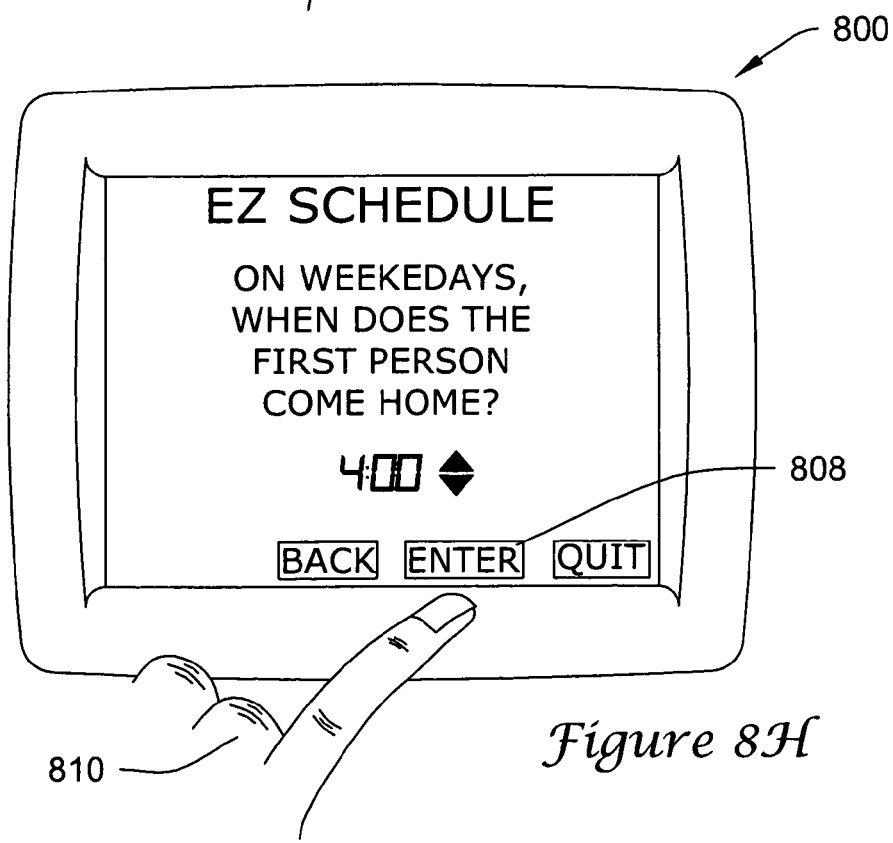
Figure 8I:
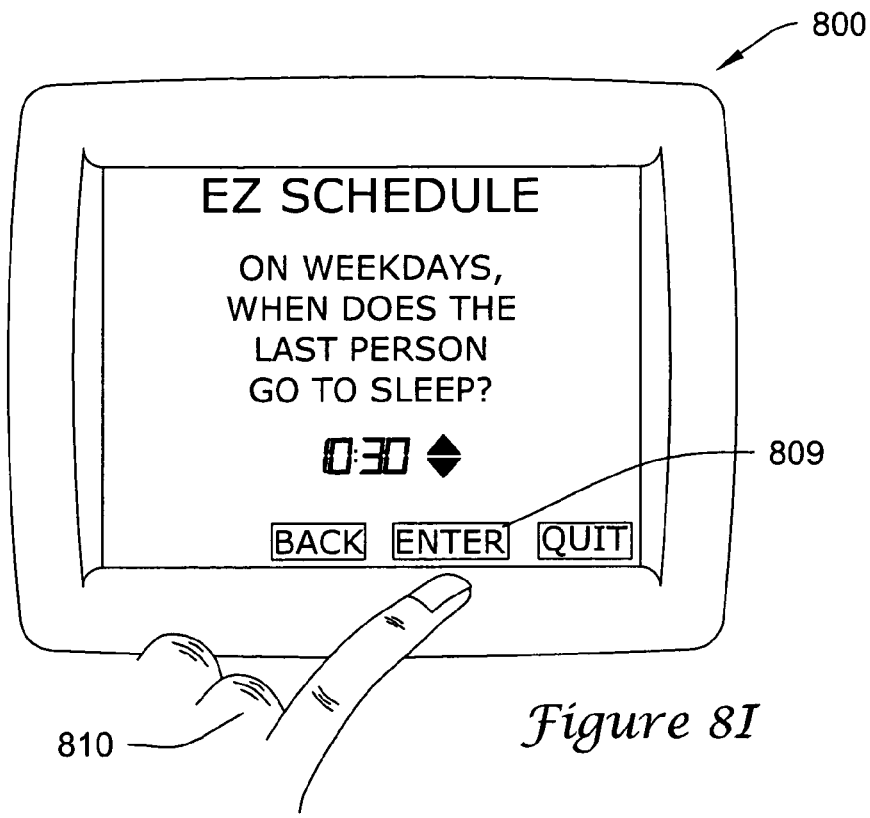
Figure 8J:
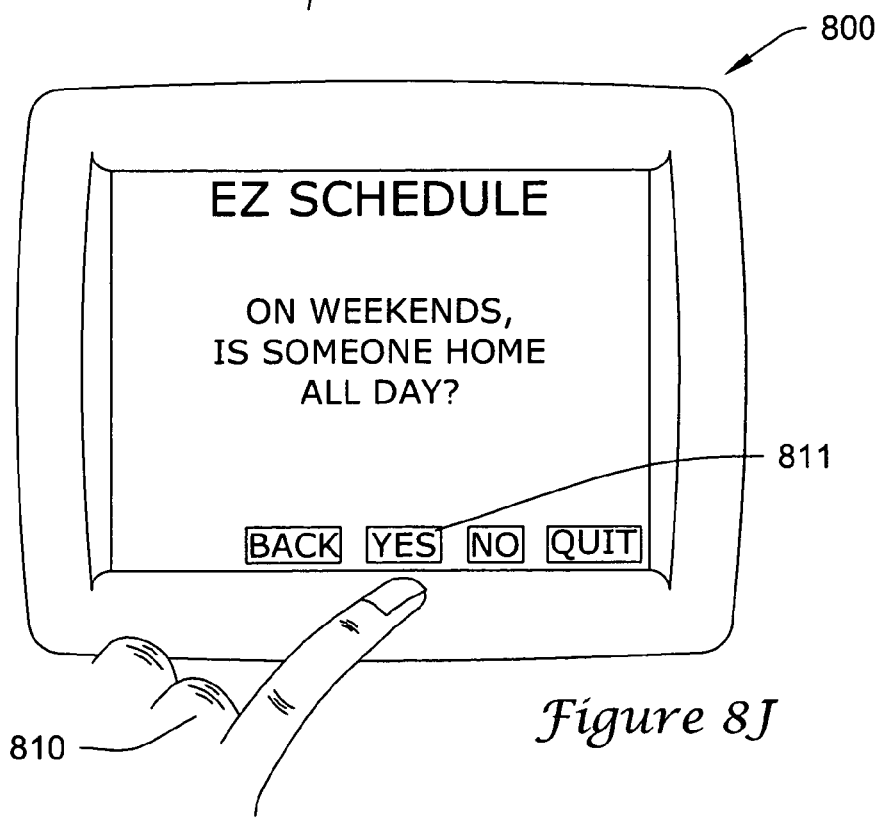
Figure 8K:
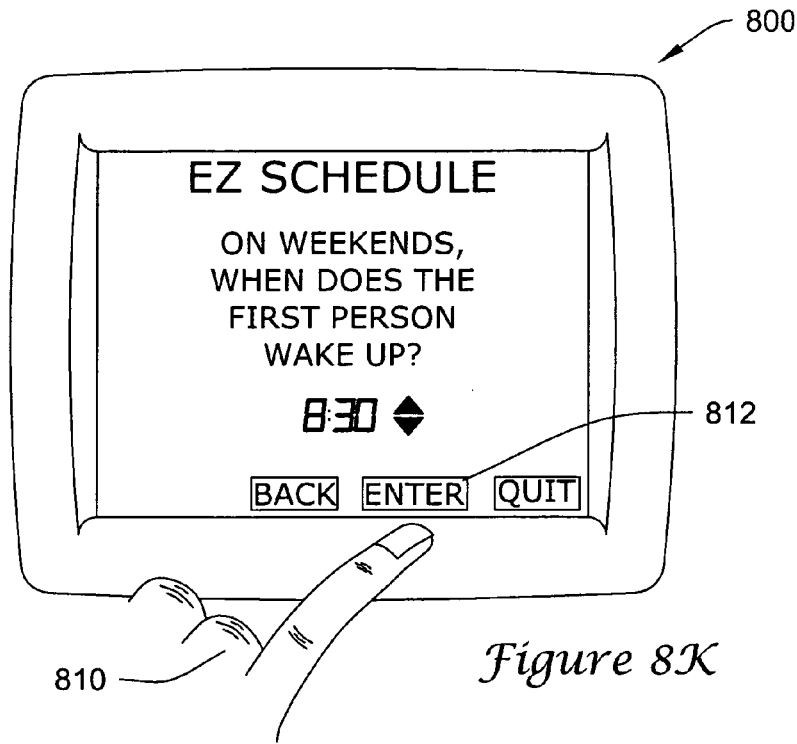
Figure 8L:
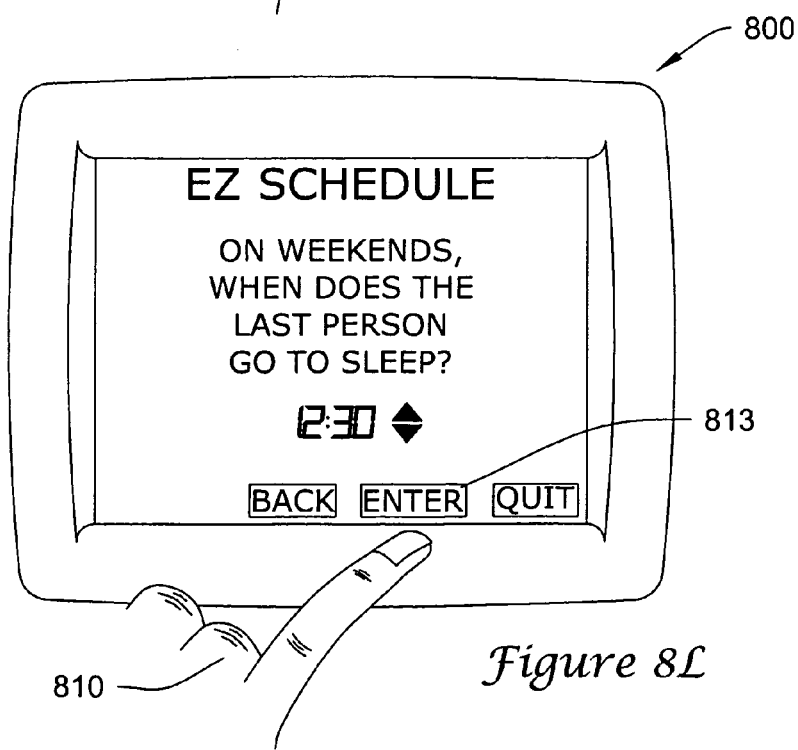
Figure 8M:
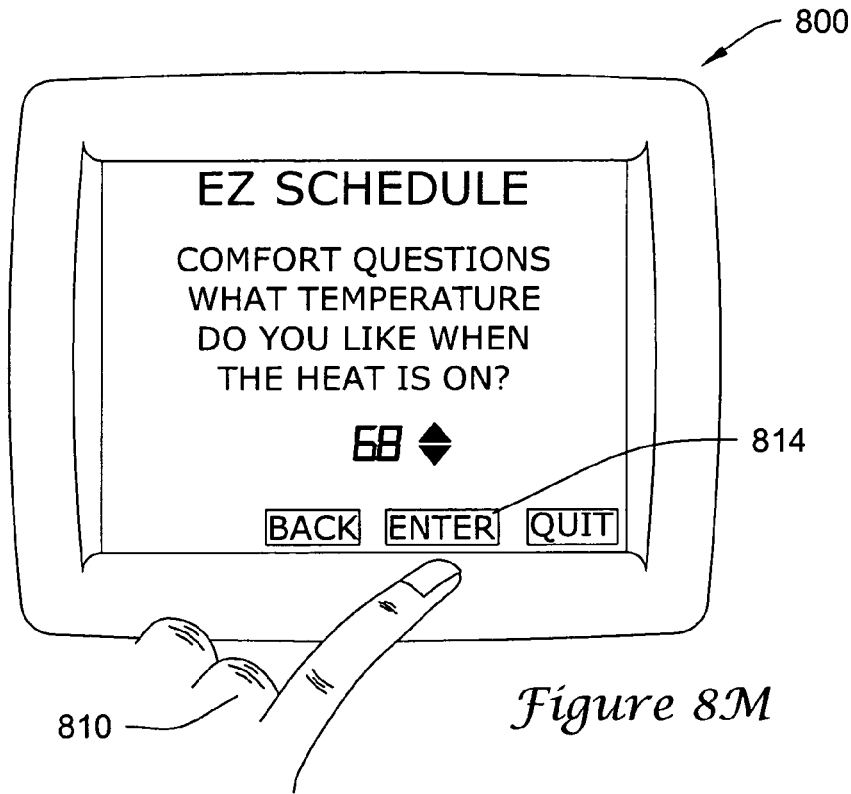
Figure 8N:
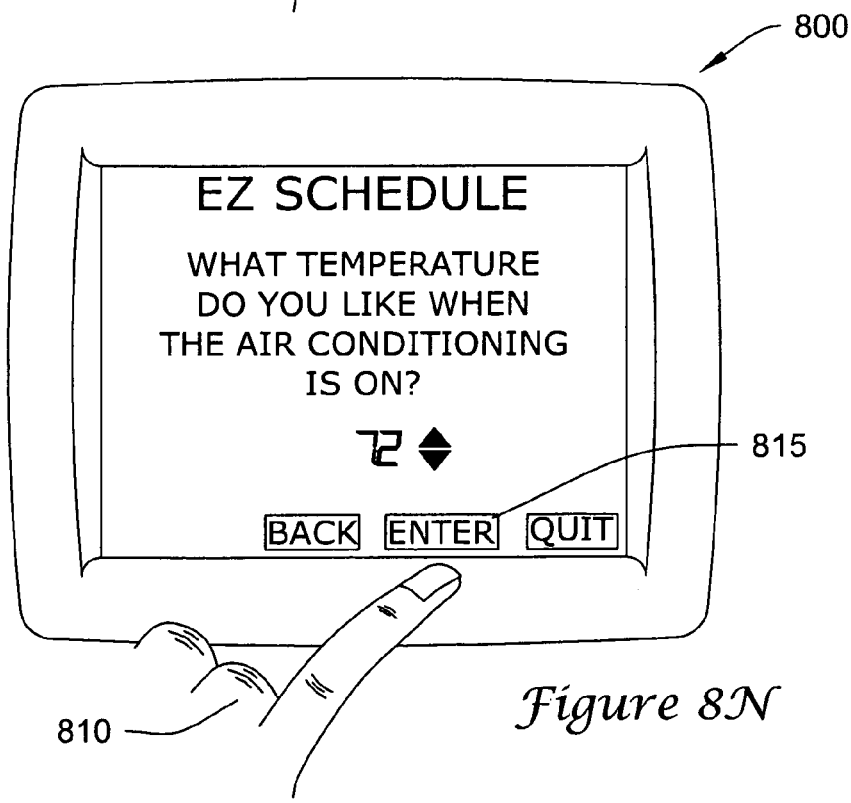
Figure 8O:
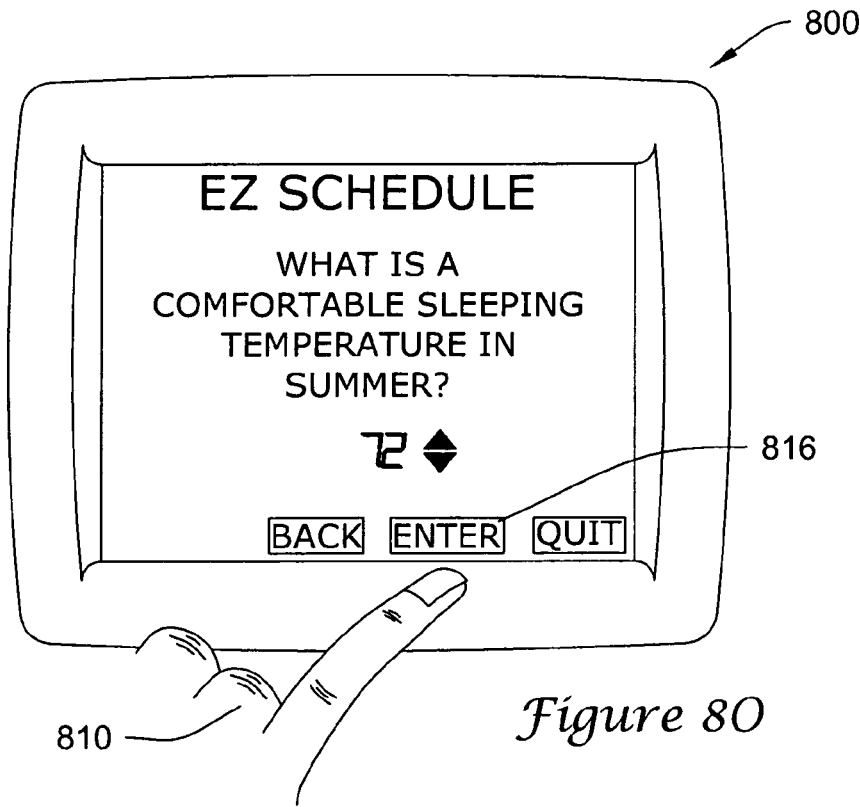
Figure 8P:
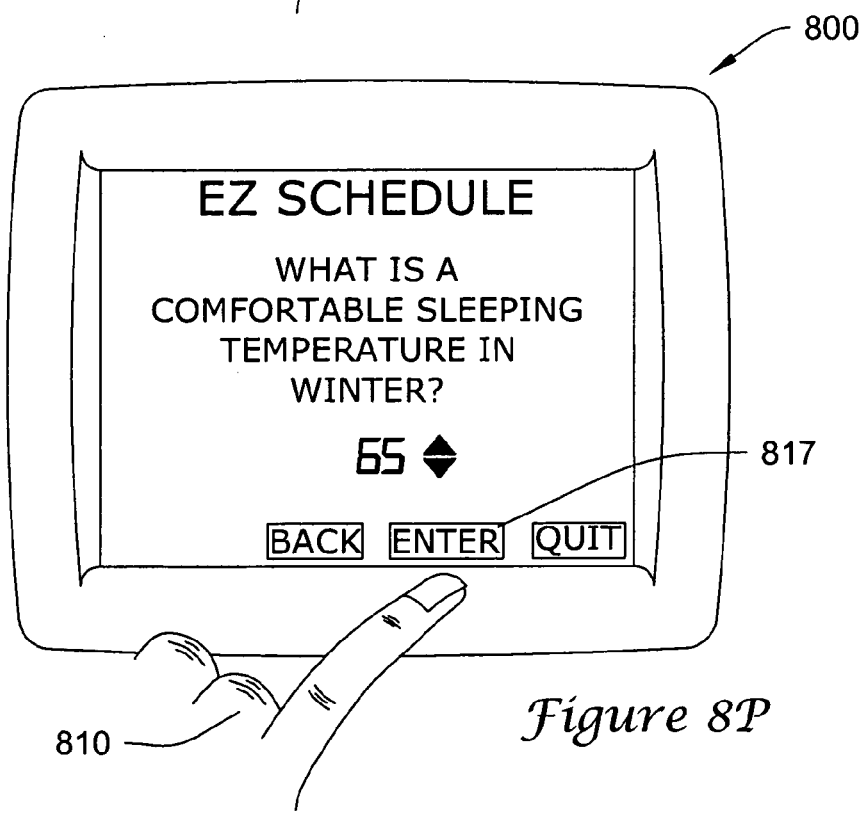
Figure 8Q:
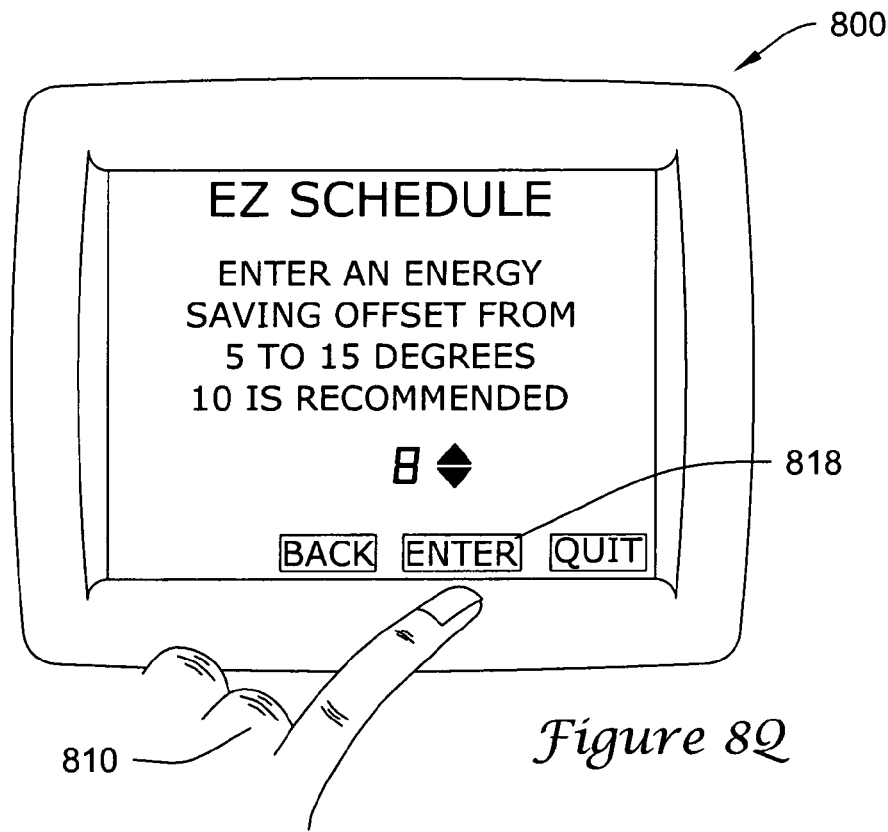
Figure 8R:
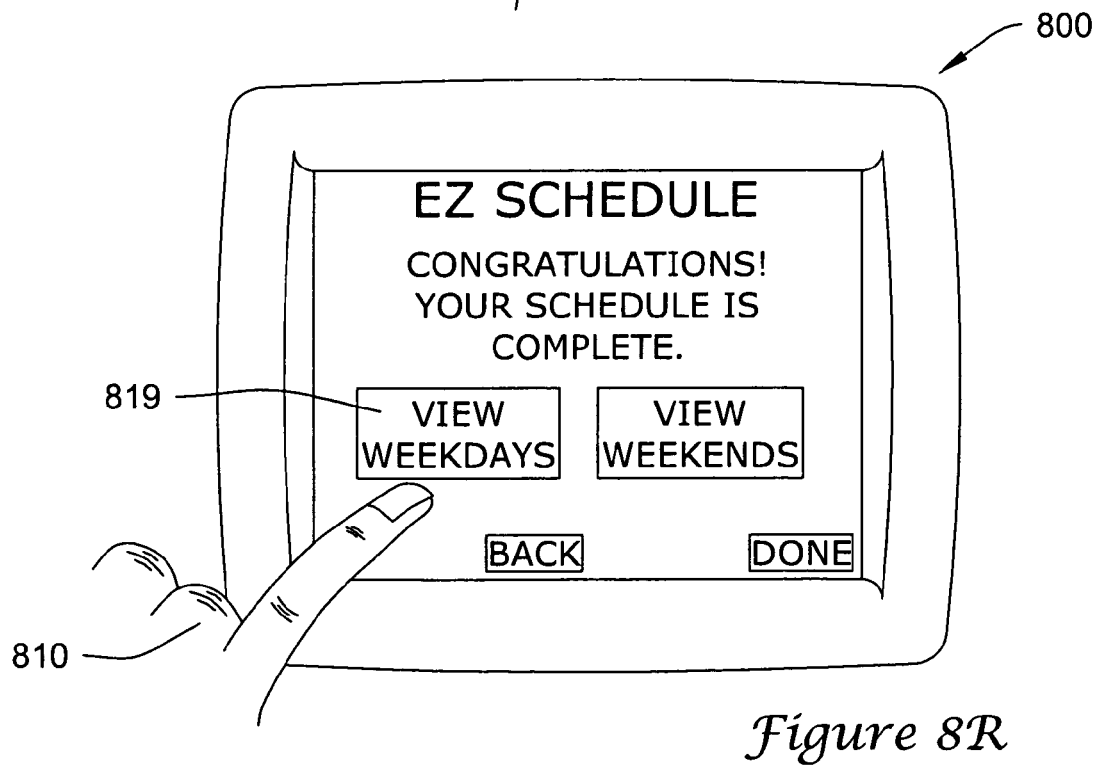
Figure 8S:
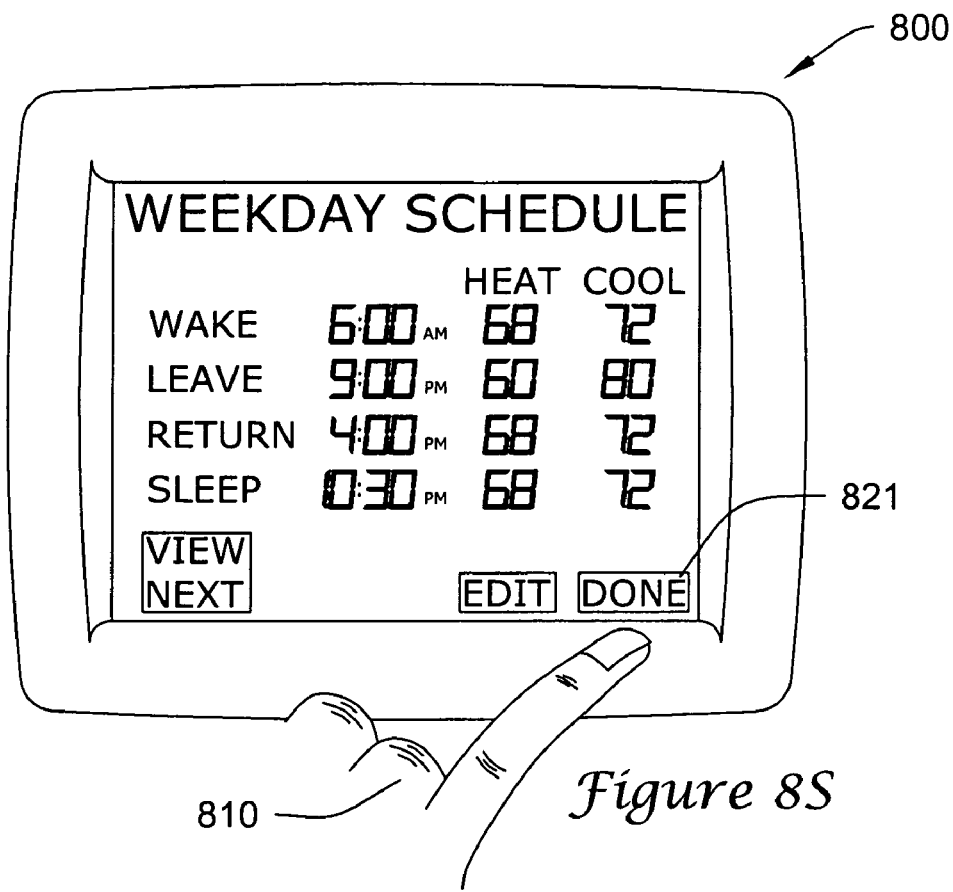
Figure 8T:
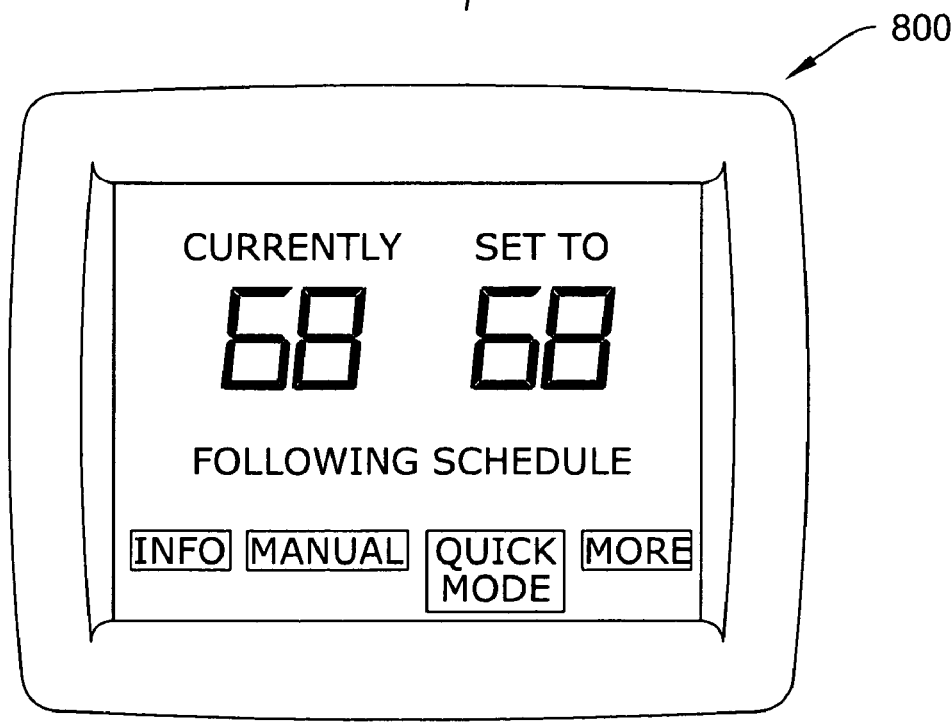

FIGS. 8A–T are schematic drawings of an illustrative HVAC interface 800 showing an illustrative embodiment of the flow diagram of the HVAC interview program shown in FIGS. 7A–7C. The schematic screen shots are taken in sequential order based on the user selections shown in each screen shot. At FIG. 8A, a user 810 selects an "EZ Schedule" 801 button located on the interface 800 to begin the interview scheduling program.

At FIG. 8B, the program asks the user 810, via the interface 800, if the user 810 wants the same schedule to apply to every day of the week. The user 810 is shown selecting a "NO" response 802.

At FIG. 8C, the program asks the user 810, via the interface 800, if the user 810 wants Saturday and Sunday to follow the same schedule. The user 810 is shown selecting a "YES" response 803.

At FIG. 8D, the program asks the user 810, via the interface 800, to verify the there will be two schedules, one for weekends and a second for weekdays. The user 810 is shown selecting a "YES" response 804.

At FIG. 8E, the program asks the user 810, via the interface 800, whether someone will be home all day on weekdays. The user 810 is shown selecting a "NO" response 805.

At FIG. 8F, the program asks the user 810, via the interface 800, to enter what time the first person wakes up on weekdays. The user 810 is shown pressing an "ENTER" button 806 after selecting a wake time.

At FIG. 8G, the program asks the user 810, via the interface 800, to enter what time the last person leaves the house on weekdays. The user 810 is shown pressing an "ENTER" button 807 after selecting a leave time.

At FIG. 8H, the program asks the user 810, via the interface 800, to enter what time the first person arrives home on weekdays. The user 810 is shown pressing an "ENTER" button 808 after selecting a return time.

At FIG. 8I, the program asks the user 810, via the interface 800, to enter what time the last person goes to sleep on weekdays. The user 810 is shown pressing an "ENTER" button 809 after selecting a sleep time.

At FIG. 8J, the program asks the user 810, via the interface 800, whether someone will be home all day on weekends. The user 810 is shown selecting a "YES" response 811.

At FIG. 8K, the program asks the user 810, via the interface 800, to enter what time the first person wakes up on weekends. The user 810 is shown pressing an "ENTER" button 812 after selecting a wake time.

At FIG. 8L, the program asks the user 810, via the interface 800, to enter what time the last person goes to sleep on weekends. The user 810 is shown pressing an "ENTER" button 813 after selecting a sleep time.

At FIG. 8M, the program asks the user 810, via the interface 800, a comfort question such as, what temperature do you like when the heat is on? The user 810 is shown pressing an "ENTER" button 814 after selecting a desired temperature.

At FIG. 8N, the program asks the user 810, via the interface 800, a comfort question such as, what temperature do you like when the air conditioning is on? The user 810 is shown pressing an "ENTER" button 815 after selecting a desired temperature.

At FIG. 8O, the program asks the user 810, via the interface 800, a comfort question such as, what is a comfortable sleeping temperature in the summer? The user 810 is shown pressing an "ENTER" button 816 after selecting a desired temperature.

At FIG. 8P, the program asks the user 810, via the interface 800, another comfort question such as, what is a comfortable sleeping temperature in the winter? The user 810 is shown pressing an "ENTER" button 817 after selecting a desired temperature.

At FIG. 8Q, the program asks the user 810, via the interface 800, another comfort question such as, what energy saving offset is desired? The user 810 is shown pressing an "ENTER" button 818 after selecting a desired energy saving offset.

At FIG. 8R, the program informs the user 810, via the interface 800, that the schedule has been completed, and may allow the user to view a portion of the schedule or selected day groupings. The user 810 is shown pressing a "VIEW WEEKDAYS" button 819.

At FIG. 8S, the program informs the user 810, via the interface 800, specifics of the selected schedule. The user 810 is shown pressing a "DONE" button 821.

At FIG. 8T, the program displays, via the interface 800, specifics of the currently running schedule.

The present invention should not be considered limited to the particular examples described above, but rather should be understood to cover all aspects of the invention as fairly set out in the attached claims. Various modifications, equivalent processes, as well as numerous structures to which the present invention can be applicable will be readily apparent to those of skill in the art to which the present invention is directed upon review of the instant specification.

What is claimed is:

1. A method of programming a schedule of an HVAC controller having a user interface, the schedule having a number of HVAC schedule parameters, the method comprising the steps of:

asking two or more interview questions of a user via the user interface, each of the two or more interview questions eliciting a numerical time and/or a numerical temperature as a response;

accepting one or more user responses from the user via the user interface, in a non-graphical form, to the two or more interview questions; and creating and/or modifying one or more of the HVAC schedule parameters based on the user responses provided by the user interface.

2. The method according to claim 1, wherein the asking step comprises asking one or more interview questions that elicit an affirmative or negative user response.

3. The method according to claim 1, wherein the asking step comprises asking one or more interview questions that elicit a "YES" or a "NO" user response.

4. The method according to claim 1, wherein the asking step comprises asking one or more interview questions that are natural language questions.

5. The method according to claim 1, wherein the asking step comprises asking one or more interview questions that are phrases.

6. The method according to claim 1, wherein the asking step comprises asking one or more interview questions that are phrases having three or more words.

7. The method according to claim 1, wherein the asking step comprises asking one or more interview questions that are audible.

8. The method according to claim 1, wherein the accepting step comprises accepting one or more user aural responses.

9. The method according to claim 1, wherein the schedule further includes one or more lawn sprinkler schedule parameters, wherein the creating and/or modifying step comprises modifying one or more lawn sprinkler schedule parameters.

10. The method according to claim 1, wherein the schedule further includes one or more security schedule parameters, wherein the creating and/or modifying step comprises modifying one or more security system schedule parameters.

11. The method according to claim 1, wherein the schedule further includes one or more lighting schedule parameters, wherein the creating and/or modifying step comprises modifying one or more lighting schedule parameters.

12. The method according to claim 1, wherein the asking step comprises asking one or more interview questions related to, which weekdays have a same schedule, when a first person wakes up, when a last person goes to sleep, when a last person leaves during the day, when a first person arrives home, what a comfortable temperature is when heat is on, what a comfortable temperature is when air conditioning is on, what a comfortable sleeping temperature is in summer, or what a comfortable sleeping temperature is in winter.

13. The method according to claim 1, wherein the asking step comprises asking one or more interview questions that provide a plurality of predetermined responses for selection by the user.

14. The method according to claim 1, wherein the asking step comprises asking one or more interview questions that further display a previous answer that was accepted by the user interface.

15. An HVAC controller comprising:
a programmable schedule, the schedule having a number of HVAC schedule parameters; and
a user interface, adapted and configured to ask two or more interview questions of a user, and to accept a numerical value for each of at least two of the two or more interview questions as user responses, said at least two of the two or more interview questions including at least one interview question relating to a comfort temperature level of the user, and at least one different question relating to a schedule of the user;
wherein, one or more of the schedule parameters are modified based on the user responses.

16. The controller according to claim 15, wherein the user interface comprises a touchscreen.

17. The controller according to claim 15, wherein the user interface provides one or more interview questions that elicit a "YES" or a "NO" user response.

18. The controller according to claim 15, wherein the user interface asks one or more interview questions that are phrases having two or more words.

19. The controller according to claim 15, wherein the one or more schedule parameters further include one or more security system schedule parameters.

20. The controller according to claim 15, wherein the user interface asks one or more interview questions that provide a plurality of predetermined responses for selection by the user.

21. An HVAC controller comprising:
schedule means for providing a programmable schedule, the programmable schedule having a number of HVAC schedule parameters; and
user interface means adapted and configured to ask two or more interview questions of a user, and to accept one or more user responses to each of the two or more interview questions from the user, said two or more interview questions including at least one interview question eliciting a discrete numerical value from the user relating to the user's comfort level and/or schedule;
wherein, the controller modifies one or more of the schedule parameters based on the user responses provided by the user interface.

22. A method of programming a schedule of an HVAC controller having a user interface, the schedule having a number of HVAC schedule parameters, the method comprising the steps of:
asking one or more interview questions a user via the user interface, said one or more interview questions including at least one interview question relating to the user's comfort level and/or schedule;
accepting one or more discrete numerical values as user responses to the one or more interview questions from the user via the user interface;
translating the one or more discrete numerical values to form a translated response including one or more setpoints; and
modifying one or more of the schedule parameters based on the translated response.

23. The method according to claim 22, wherein the asking step comprises asking one or more interview questions that elicit a "YES" or a "NO" user response.

24. The method according to claim 22, wherein the asking step comprises asking one or more interview questions that are natural language questions.

25. The method according to claim 22, wherein the asking step comprises asking one or more interview questions that are phrases having three or more words.

26. The method according to claim 22, wherein the schedule further includes one or more lawn sprinkler schedule parameters, wherein the modifying step comprises modifying one or more lawn sprinkler schedule parameters.

27. The method according to claim 22, wherein the asking step comprises asking one or more interview questions that provide a plurality of predetermined responses for selection by the user.

28. An HVAC controller comprising:
a programmable schedule, the schedule having a number of HVAC schedule parameters;
a user interface, adapted and configured to ask one or more interview questions of a user, and to accept one or more discrete numerical values as user responses to each of at least one of the one or more interview questions from the user, said one or more interview questions including at least one interview question relating to the user's comfort level and/or schedule; and
a translator, adapted and configured to translate the one or more discrete numerical values of the user responses to form a translated response;
wherein, the number of schedule parameters are modified based on the translated response.

29. The controller according to claim 28, wherein the user interface asks one or more interview questions that elicit a "YES" or a "NO" user response.

30. The controller according to claim 28, wherein the user interface asks one or more interview questions that are phrases having two or more words.

31. The controller according to claim 28, wherein the schedule further includes one or more security system schedule parameters.

32. The controller according to claim 28, wherein the user interface asks one or more interview questions that provide a plurality of predetermined responses for selection by the user.

33. A method of programming a schedule of an HVAC controller having a user interface, the schedule having a number of HVAC schedule parameters, the method comprising the steps of:
sequentially posing a number of queries to a user via the user interface, at least one of said queries relating to the user's comfort and at least another one of the queries related to a user's schedule; and
accepting user responses to at least selected queries, the sequence of queries adapted to collect sufficient information from the user responses to generate at least a major portion of the schedule parameters.

34. The method according to claim 33, wherein the sequentially posing step comprises sequentially posing a number of queries that elicit a "YES" or a "NO" user response.

35. The method according to claim 33, wherein the sequentially posing step comprises sequentially posing a number of queries that are context sensitive to the user response.

36. The method according to claim 35, wherein the accepting step comprises determining the number and/or sequence of queries based on the user responses to the context sensitive queries.

37. The method according to claim 33, further comprising the step of generating HVAC schedule parameters using the user responses accepted during the accepting step.

38. The method according to claim 33, wherein the schedule parameters further include one or more lawn sprinkler schedule parameters.

39. The method according to claim 33, wherein the sequentially posing a number of queries step includes sequentially posing a number of queries related to, which weekdays will have a same schedule, when a first person wakes up, when a last person goes to sleep, when a last person leaves during the day, when a first person arrives home, what a comfortable temperature is when heat is on, what a comfortable temperature is when air conditioning is on, what a comfortable sleeping temperature is in summer, or what a comfortable sleeping temperature is in winter.

40. The method according to claim 33, wherein the sequentially posing step comprises sequentially posing one or more queries that provide a plurality of predetermined responses for selection by the user.

* * * * *